United States Patent
Kinomura

(10) Patent No.: US 11,890,999 B2
(45) Date of Patent: Feb. 6, 2024

(54) VEHICLE, POWER FEEDING SYSTEM, AND POWER FEEDING METHOD

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/886,054

(22) Filed: Aug. 11, 2022

(65) Prior Publication Data
US 2023/0049374 A1 Feb. 16, 2023

(30) Foreign Application Priority Data
Aug. 16, 2021 (JP) ................. 2021-132279

(51) Int. Cl.
*B60R 16/03* (2006.01)
*B60R 16/023* (2006.01)
*H02J 7/00* (2006.01)
*B60R 16/033* (2006.01)

(52) U.S. Cl.
CPC ...... *B60R 16/0315* (2013.01); *B60R 16/0238* (2013.01); *B60R 16/033* (2013.01); *H02J 7/0063* (2013.01)

(58) Field of Classification Search
CPC ............ B60R 16/0315; B60R 16/0238; B60R 16/033; H02J 7/0063
USPC ................................................. 307/9.1, 10.1
See application file for complete search history.

(56) References Cited

U.S. PATENT DOCUMENTS

| 2015/0038020 | A1 | 2/2015 | Kinomura et al. | |
|---|---|---|---|---|
| 2017/0222463 | A1* | 8/2017 | Pullen | H02J 7/04 |
| 2020/0122585 | A1* | 4/2020 | Bhat | G05B 19/0426 |
| 2021/0104851 | A1* | 4/2021 | Bhat | B60L 55/00 |

FOREIGN PATENT DOCUMENTS

JP 5099281 B1 12/2012

* cited by examiner

*Primary Examiner* — Michael R. Fin
(74) *Attorney, Agent, or Firm* — Dinsmore & Shohl LLP

(57) ABSTRACT

A vehicle includes a power storage device, a discharging port, a power conversion circuit, and a controller. The discharging port includes a first output terminal, a second output terminal and a ground terminal. Each of the first output terminal and the second output terminal is not grounded to a body of the vehicle. The controller is configured to obtain a requested voltage value of a discharging connector connected to the discharging port. When the discharging connector is connected to the discharging port, the controller controls the power conversion circuit such that a voltage corresponding to the requested voltage value of the discharging connector is applied between the first output terminal and the second output terminal.

6 Claims, 18 Drawing Sheets

VEHICLE, POWER FEEDING SYSTEM, AND POWER FEEDING METHOD

This nonprovisional application is based on Japanese Patent Application No. 2021-132279 filed on Aug. 16, 2021 with the Japan Patent Office, the entire contents of which are hereby incorporated by reference.

BACKGROUND

Field

The present disclosure relates to a vehicle including a discharging port connectable to a discharging assembly, a power feeding system, and a power feeding method.

Description of the Background Art

For example, Japanese Patent No. 5099281 discloses a connector structure for taking out electric power stored in a power storage device mounted on a vehicle to the outside of the vehicle.

SUMMARY

By connecting a discharging assembly (including a discharging connector) to a discharging port of a vehicle, power feeding using the vehicle as a power supply becomes possible. The discharging assembly may consist of a discharging connector alone, or may include an electric vehicle power system (EVPS) connected to a discharging connector through a cable. A ground terminal of the discharging port (e.g., inlet) of the vehicle is generally grounded (body-earthed) to a body of the vehicle. However, if a terminal subjected to application of a voltage is body-earthed when the vehicle performs power feeding through the discharging assembly, noise from the body of the vehicle is likely to be superimposed on the supplied power.

The present disclosure has been made to solve the above-described problem, and an object of the present disclosure is to reduce noise included in the supplied power when a vehicle performs power feeding through a discharging assembly (including a discharging connector).

A vehicle according to a first aspect of the present disclosure includes a power storage device, a discharging port, a power conversion circuit, and a controller. The power conversion circuit is configured to receive DC power supplied from the power storage device and output the DC power to the discharging port side. The discharging port includes a first output terminal, a second output terminal and a ground terminal. Each of the first output terminal and the second output terminal is not grounded to a body of the vehicle. The controller is configured to obtain a requested voltage value of a discharging connector connected to the discharging port. When the discharging connector is connected to the discharging port, the controller controls the power conversion circuit such that a voltage corresponding to the requested voltage value of the discharging connector is applied between the first output terminal and the second output terminal.

In the above-described vehicle, each of the first output terminal and the second output terminal is not grounded to the body of the vehicle (electrically disconnected from the body of the vehicle), and thus, it is possible to reduce noise superimposed on the voltage applied between the first output terminal and the second output terminal. Therefore, it is possible to reduce noise included in the supplied power when the vehicle performs power feeding through the discharging assembly (including the discharging connector). In addition, in the above-described vehicle, the controller obtains the requested voltage value of the discharging connector connected to the discharging port. Therefore, the electric power suitable for the discharging connector is easily supplied from the discharging port of the vehicle to the discharging connector. The power conversion circuit may be an inverter, or may be a voltage converter.

The vehicle may further include a switch (hereinafter, also referred to as "ground switch") that switches a conduction state and an insulated state between the ground terminal and the body of the vehicle.

According to the above-described ground switch, the ground terminal of the discharging port can be grounded to or disconnected from the body of the vehicle, depending on the situation.

The discharging port may include a detection terminal that outputs, to the controller, a potential signal indicating information about a discharging assembly connected to the discharging port. In a state where the discharging connector is connected to the discharging port, a closed circuit may be formed such that the detection terminal and the ground terminal are connected to each other with the discharging connector interposed therebetween. The controller may be configured to, when the ground switch is in the conduction state, obtain the requested voltage value of the discharging connector of the discharging assembly and a type of an electrical outlet of the discharging assembly, based on the potential signal from the detection terminal. The type of the electrical outlet includes a first electrical outlet that outputs an AC voltage to be applied between the first output terminal and the second output terminal, a second electrical outlet that outputs an AC voltage to be applied between the first output terminal and the ground terminal, and a third electrical outlet that outputs an AC voltage to be applied between the second output terminal and the ground terminal.

According to the above-described configuration, when the ground switch is in the conduction state (i.e., when the ground terminal of the discharging port is grounded to the body of the vehicle), the controller obtains the information about the discharging assembly (specifically, the requested voltage value of the discharging connector of the discharging assembly and the type of the electrical outlet of the discharging assembly), based on the potential signal from the detection terminal. Therefore, higher accuracy of the potential signal is achieved.

The power conversion circuit may include a first power conversion circuit and a second power conversion circuit. The first power conversion circuit may be configured to apply an AC voltage between the first output terminal and the ground terminal. The second power conversion circuit may be configured to apply an AC voltage between the second output terminal and the ground terminal. When the discharging connector of the discharging assembly including at least one of the second electrical outlet and the third electrical outlet is connected to the discharging port, the controller may bring the ground switch into the insulated state. After the controller brings the ground switch into the insulated state, the controller may control the first power conversion circuit and the second power conversion circuit such that an AC voltage corresponding to the requested voltage value of the discharging connector is applied between the first output terminal and the second output terminal.

According to the above-described configuration, when the discharging connector of the discharging assembly including at least one of the second electrical outlet and the third electrical outlet is connected to the discharging port, the ground terminal of the discharging port is electrically disconnected from the body of the vehicle by the ground switch. Thus, noise from the body of the vehicle is less likely to be superimposed on the supplied power. In addition, according to the above-described configuration, the AC voltage generated by the first power conversion circuit and the second power conversion circuit is applied between the first output terminal and the second output terminal. Since the voltage applied between the first output terminal and the second output terminal is generated by the two power conversion circuits, load imposed on one power conversion circuit is reduced. The power conversion circuit may be configured to convert DC power output from the power storage device into AC power. The power conversion circuit may be configured to be capable of converting at least one of a voltage and a frequency.

The discharging port may be configured to be connectable to a first discharging connector of a first discharging assembly. The first discharging connector may include a first input terminal connected to a first voltage line, a second input terminal connected to a second voltage line, and a ground terminal connected to a neutral line. When the first discharging connector and the discharging port are connected to each other, the first input terminal, the second input terminal and the ground terminal of the first discharging connector may come into contact with the first output terminal, the second output terminal and the ground terminal of the discharging port, respectively.

The first discharging assembly may include three electrical outlets A to C described below. Electrical outlet A corresponds to the first electrical outlet and includes a first voltage terminal connected to the first voltage line, a second voltage terminal connected to the second voltage line, and a ground terminal connected to the neutral line. Electrical outlet B corresponds to the second electrical outlet and includes a voltage terminal connected to the first voltage line, and a ground terminal connected to the neutral line. Electrical outlet C corresponds to the third electrical outlet and includes a voltage terminal connected to the second voltage line, and a ground terminal connected to the neutral line.

When the first discharging connector of the first discharging assembly is connected to the discharging port, the controller may bring the ground switch into the insulated state. After the controller brings the ground switch into the insulated state, the controller may control the first power conversion circuit such that an AC voltage corresponding to a half of the requested voltage value of the first discharging connector is applied between the first output terminal and the ground terminal, and control the second power conversion circuit such that an AC voltage corresponding to a half of the requested voltage value of the first discharging connector is applied between the second output terminal and the ground terminal.

According to the above-described configuration, the AC power having different voltages can be supplied from one discharging port of the vehicle, using the three-line-type first discharging connector. The AC power can be supplied from the vehicle to electrical outlets A to C of the first discharging connector.

In some embodiments, the vehicle may not be provided with the above-described ground switch. The ground terminal of the discharging port may be grounded to the body of the vehicle. The discharging port may be configured to be connectable to each of a second discharging connector of a second discharging assembly described below and a third discharging connector of a third discharging assembly described below.

Each of the second discharging assembly and the third discharging assembly includes an electrical outlet that outputs a voltage to be applied between the first output terminal and the second output terminal. A requested voltage value of the second discharging connector is a first voltage. A requested voltage value of the third discharging connector is a second voltage higher than the first voltage.

When the second discharging connector of the second discharging assembly is connected to the discharging port, the controller may control the power conversion circuit such that a voltage corresponding to the first voltage is applied between the first output terminal and the second output terminal. When the third discharging connector of the third discharging assembly is connected to the discharging port, the controller may control the power conversion circuit such that a voltage corresponding to the second voltage is applied between the first output terminal and the second output terminal.

According to the above-described configuration, a plurality of types of discharging assemblies that output different voltages can be connected to the discharging port of the vehicle. According to the above-described configuration, the electric power suitable for the discharging assembly connected to the discharging port is easily supplied to each discharging assembly.

The first voltage may be equal to or higher than 95 V and equal to or lower than 150 V. The second voltage may be equal to or higher than 190 V and equal to or lower than 300 V. According to the above-described configuration, an electrical device having a driving voltage around 100 V can be used when the second discharging assembly is connected to the discharging port, and an electrical device having a driving voltage around 200 V can be used when the third discharging assembly is connected to the discharging port.

The discharging port may include a detection terminal whose potential changes in accordance with the requested voltage value of the discharging connector connected to the discharging port. A potential signal of the detection terminal may be input to the controller. According to the above-described configuration, the controller can easily and accurately obtain the requested voltage value of the discharging connector connected to the discharging port.

The detection terminal may be configured to determine a state of the discharging port. The state determined by the detection terminal may include a non-fitted state, a fitted state and a connected state. The non-fitted state may be a state in which the discharging port is not electrically connected to the discharging connector. The fitted state is a state in which the discharging port is electrically connected to the discharging connector and the discharging connector is not latched. The connected state may be a state in which the discharging port is electrically connected to the discharging connector and the discharging connector is latched.

According to the above-described configuration, it is possible to make proper determination among the non-fitted state, the fitted state and the connected state, based on the potential of the detection terminal.

Any vehicle described above may be an electrically-powered vehicle (hereinafter, also referred to as "xEV"). The xEV is a vehicle that utilizes electric power as the whole or a part of motive power source. The xEV includes a battery electric vehicle (BEV), a plug-in hybrid electric vehicle (PHEV) and a fuel cell electric vehicle (FCEV).

A power feeding system according to a second aspect of the present disclosure includes: a vehicle including a discharging port; and a plurality of types of discharging assemblies configured to be connectable to the discharging port. Each of the plurality of types of discharging assemblies includes a discharging connector configured to be connectable to the discharging port, and an electrical outlet that receives electric power supplied from the discharging connector and outputs a voltage. The vehicle further includes a power storage device, a power conversion circuit and a controller. The discharging port includes a first output terminal, a second output terminal and a ground terminal. Each of the first output terminal and the second output terminal is not grounded to a body of the vehicle. The controller is configured to obtain a requested voltage value of the discharging connector connected to the discharging port. When the discharging connector is connected to the discharging port, the controller controls the power conversion circuit such that a voltage corresponding to the requested voltage value of the discharging connector is applied between the first output terminal and the second output terminal.

According to the above-described power feeding system as well, similarly to the above-described vehicle, it is possible to reduce noise included in the supplied power when the vehicle performs power feeding through the discharging assembly (including the discharging connector).

A power feeding method according to a third aspect of the present disclosure includes a determination process and a voltage application process described below.

The determination process includes determining whether a discharging assembly connected to a discharging port of a vehicle includes at least one of a second electrical outlet and a third electrical outlet, of a first electrical outlet, the second electrical outlet and the third electrical outlet, the first electrical outlet being an electrical outlet that outputs a voltage to be applied between a first output terminal and a second output terminal of the discharging port, the second electrical outlet being an electrical outlet that outputs a voltage to be applied between the first output terminal and a ground terminal of the discharging port, the third electrical outlet being an electrical outlet that outputs a voltage to be applied between the second output terminal and the ground terminal of the discharging port.

The voltage application process includes: electrically disconnecting the ground terminal of the discharging port from a body of the vehicle when it is determined that the discharging assembly connected to the discharging port includes at least one of the second electrical outlet and the third electrical outlet; and applying, after electrically disconnecting the ground terminal from the body, the voltage to at least one of between the first output terminal and the ground terminal and between the second output terminal and the ground terminal.

According to the above-described method as well, similarly to the above-described vehicle, it is possible to reduce noise included in the supplied power when the vehicle performs power feeding through the discharging assembly (including the discharging connector).

In the determination process, when a requested voltage value of the discharging assembly is within a prescribed range, it may be determined that the discharging assembly connected to the discharging port includes at least one of the second electrical outlet and the third electrical outlet.

According to the above-described configuration, it is possible to easily determine whether the discharging assembly connected to the discharging port includes at least one of the second electrical outlet and the third electrical outlet, based on the requested voltage value of the discharging assembly. The prescribed range may be a prescribed voltage value (one certain point). When the requested voltage value is, for example, 200 V, it may be determined that the discharging assembly connected to the discharging port includes at least one of the second electrical outlet and the third electrical outlet.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
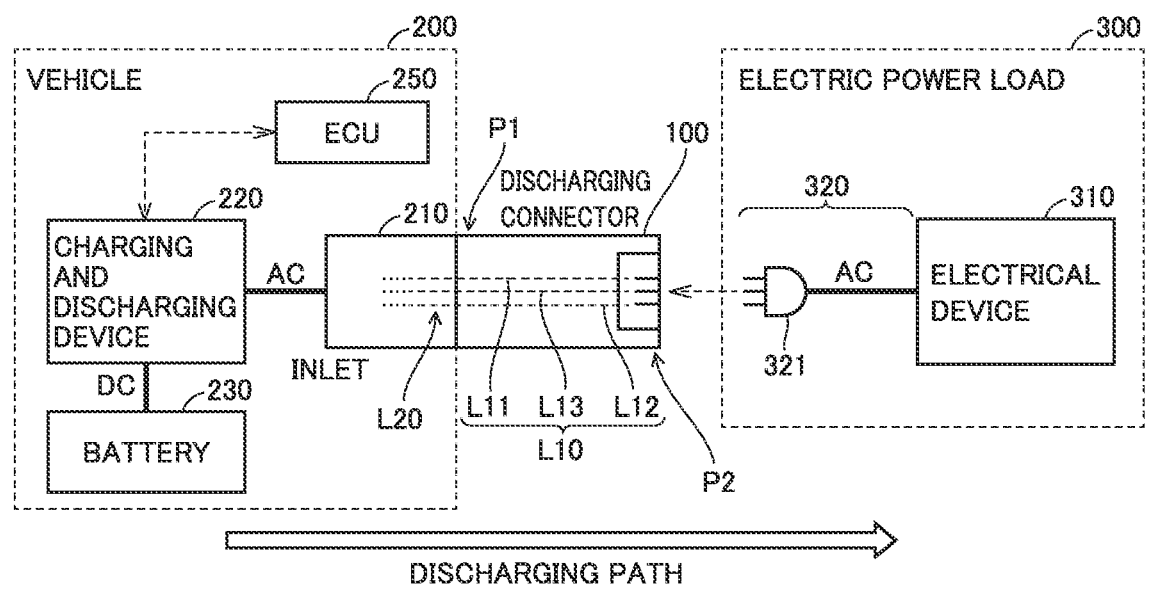
FIG. 1 is an overall configuration diagram of a power feeding system according to an embodiment of the present disclosure.

An embodiment of the present disclosure will be described in detail with reference to the drawings, in which the same or corresponding portions are denoted by the same reference characters and description thereof will not be repeated. Hereinafter, an electronic control unit will be referred to as "ECU". In addition, an alternating current may be referred to as "AC" and a direct current may be referred to as "DC".

FIG. 1 is an overall configuration diagram of a power feeding system according to the present embodiment. Referring to FIG. 1, the power feeding system according to the present embodiment is applied to V2L (Vehicle to Load) in which electric power is directly supplied from a vehicle to an electrical device. In the V2L, using a power converter (e.g., vehicle-mounted inverter) that is designed for the vehicle and not fixed to the ground, electric power is directly supplied to the electrical device, separately from a power system. The power system is a transmission and distribution network system (commercial power system) for supplying electric power from an electric power provider to an electric power user. The vehicle-mounted inverter is a device built into the vehicle to convert DC power of a vehicle-mounted battery for driving into AC power and supply the AC power to the electrical device.

Specifically, the power feeding system according to the present embodiment includes a discharging connector 100 and a vehicle 200, and is configured to supply electric power supplied from vehicle 200 to an electric power load 300 through discharging connector 100. In the present embodiment, discharging connector 100 includes a first end P1 (input end) and a second end P2 (output end), and functions as a discharging assembly. Discharging connector 100 corresponds to an example of "first discharging connector (first discharging assembly)" according to the present disclosure. Although any vehicle having the discharging function can be used as vehicle 200, a battery electric vehicle (BEV) that does not include an engine (internal combustion engine) is used as vehicle 200 in the present embodiment.

Electric power load 300 includes an electrical device 310 (device main body), and a power cord 320 connecting to electrical device 310. Electrical device 310 is driven when prescribed AC power is supplied to electrical device 310 through power cord 320. Discharging connector 100 includes an electrical outlet to which a plug 321 of power cord 320 is connectable. Details of the electrical outlet of discharging connector 100 will be described below (see FIGS. 5 and 8).

Vehicle 200 includes an inlet 210 (vehicle inlet), a charging and discharging device 220, a battery 230, and an ECU 250. Inlet 210 and battery 230 correspond to examples of "discharging port" and "power storage device" according to the present disclosure, respectively. Inlet 210 corresponds to a portion of a coupling system for discharging that is fixed in vehicle 200. Battery 230 includes, for example, a secondary battery. Examples of the secondary battery include a lithium ion battery or a nickel-metal hydride battery. Battery 230 may include one or more power storage devices selected from the group consisting of a liquid-based secondary battery, an all-solid-state secondary battery, an assembled battery, and an electric double-layer capacitor. Vehicle 200 is configured to be capable of traveling using electric power stored in battery 230. Vehicle 200 includes an electric motor (not shown) that receives the electric power supplied from battery 230, and travels using motive power generated by the electric motor.

Charging and discharging device 220 is configured to charge battery 230. Specifically, charging and discharging device 220 is configured to convert AC power supplied from the outside of vehicle 200 to inlet 210 into DC power (AC/DC conversion) and output the DC power to battery 230. Charging and discharging device 220 is also configured to discharge the electric power of battery 230 to the outside of vehicle 200. Specifically, charging and discharging device 220 is configured to convert DC power supplied from battery 230 into AC power (DC/AC conversion) and output the AC power to inlet 210.

Figure 2:
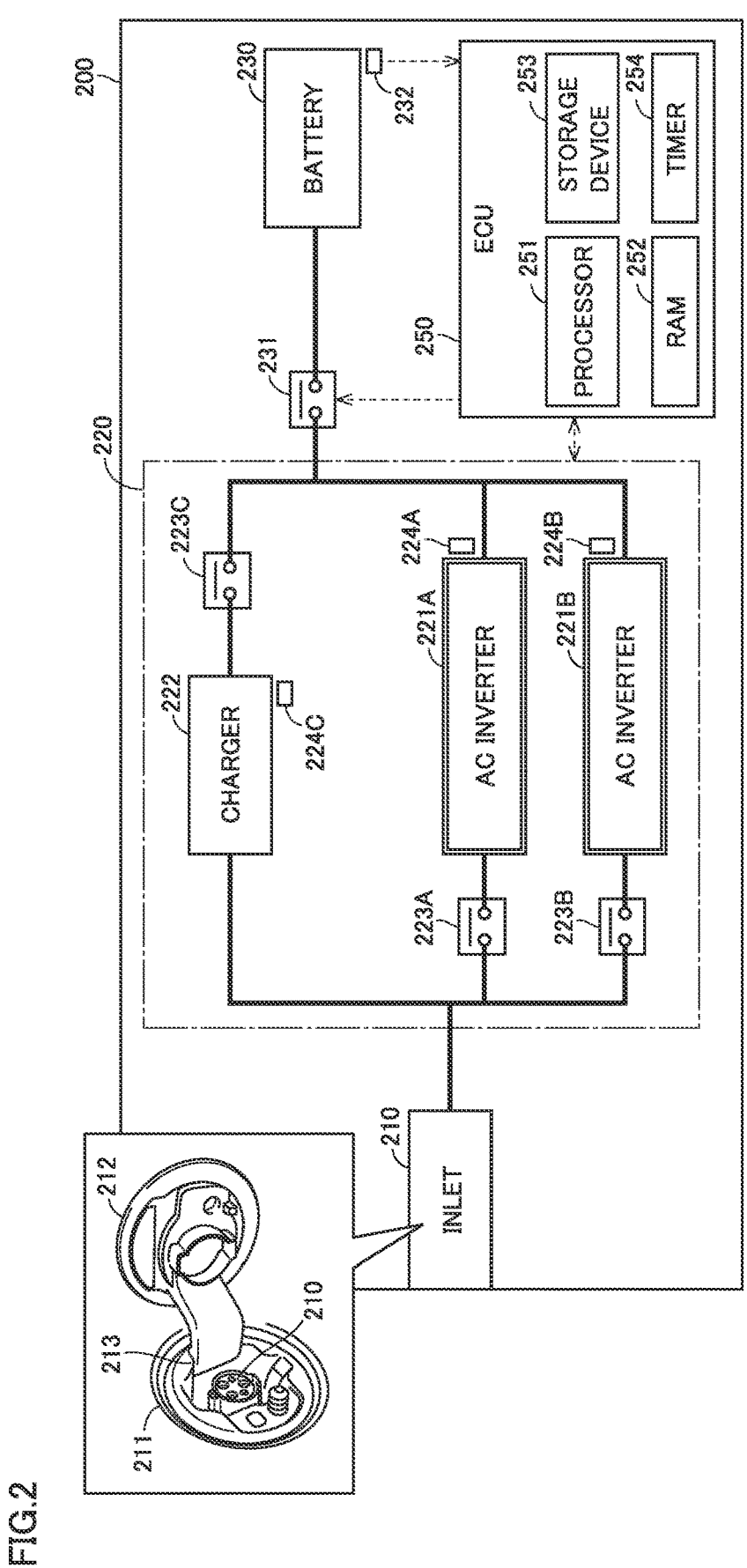
FIG. 2 shows a configuration of a charging and discharging device shown in FIG. 1 and its surroundings.

FIG. 2 shows a configuration of charging and discharging device 220 and its surroundings. Referring to FIG. 2, a system main relay (SMR) 231 is provided between charging and discharging device 220 and battery 230. SMR 231 is configured to switch between connection and disconnection of a power path that connects charging and discharging device 220 and battery 230 to each other. When the electric power is exchanged between inlet 210 and battery 230, SMR 231 is brought into a closed state (connected state) by ECU 250. Battery 230 is provided with a battery management system (BMS) 232. BMS 232 includes various sensors that detect a state of battery 230, and outputs the detection results to ECU 250. Based on the output of BMS 232, ECU 250 can obtain the state (e.g., a temperature, a current, a voltage, a state of charge (SOC), and an internal resistance) of battery 230.

Inlet 210 is arranged in an opening 211 provided in a vehicle body. A lid 212 is provided to open and close opening 211. Lid 212 is configured to be coupled to the vehicle body through an opening and closing mechanism 213 (e.g., hinge), so as to be capable of opening and closing opening 211. Inlet 210 is used when lid 212 is open. When lid 212 is closed, lid 212 covers opening 211 (including inlet 210), thereby prohibiting the use of inlet 210. Inlet 210 according to the present embodiment is an AC inlet. Namely, when inlet 210 is used for charging of battery 230, AC power is input from the outside of vehicle 200 to inlet 210.

ECU 250 is configured to control charging and discharging device 220. ECU 250 may be a computer. ECU 250 includes a processor 251, a random access memory (RAM) 252, a storage device 253, and a timer 254. ECU 250 corresponds to an example of "controller" according to the present disclosure. In the present embodiment, when processor 251 executes a program stored in storage device 253 in ECU 250, various types of control in vehicle 200 are executed. However, various types of control in vehicle 200 are not limited to execution by software, and can also be executed by dedicated hardware (electronic circuit). The number of processors of ECU 250 is arbitrary, and a processor may be provided for each prescribed control.

Between inlet 210 and battery 230, charging and discharging device 220 includes an AC inverter 221A, an AC inverter 221B and a charger 222 that are connected in parallel with each other. AC inverters 221A and 221B may be housed in separate housings, or may be housed in the same housing together. AC inverter 221A and AC inverter 221B correspond to examples of "first power conversion circuit" and "second power conversion circuit" according to the present disclosure, respectively.

A discharging relay 223A is provided between AC inverter 221A and inlet 210. Discharging relay 223A is configured to switch between connection and disconnection of a discharging path extending from AC inverter 221A to inlet 210. In addition, a discharging relay 223B is provided between AC inverter 221B and inlet 210. Discharging relay 223B is configured to switch between connection and disconnection of a discharging path extending from AC inverter 221B to inlet 210. Hereinafter, when AC inverter 221A and AC inverter 221B are not distinguished from each other, AC inverters 221A and 221B will also be collectively referred to as "AC inverter 221".

Figure 3:
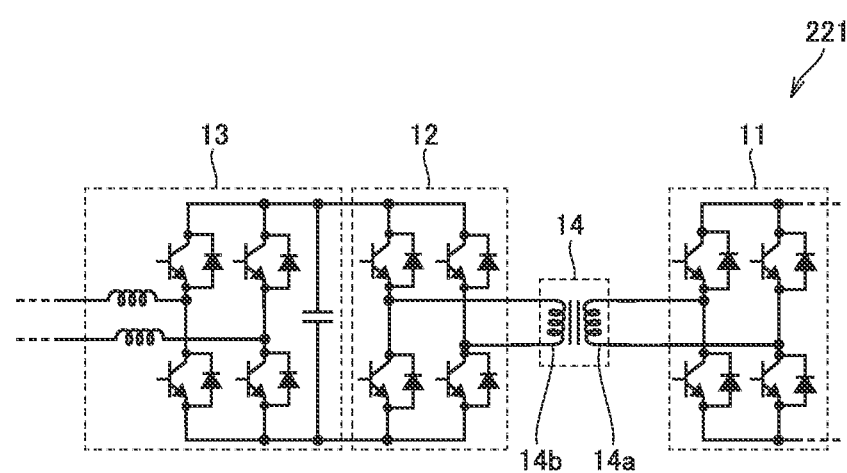
FIG. 3 shows a circuit configuration example of a vehicle-mounted inverter shown in FIG. 2.

FIG. 3 shows a circuit configuration example of AC inverter 221. Referring to FIG. 3 together with FIG. 2, AC inverter 221 includes inverters 11 to 13 and an insulating circuit 14. Each of inverters 11 to 13 includes a full-bridge circuit including four switching elements. Of inverters 11 to 13, inverter 13 located closest to inlet 210 further includes two reactors and one smoothing capacitor. Each switching element included in inverters 11 to 13 is controlled by ECU 250. Insulating circuit 14 is an insulating transformer including a first coil 14a and a second coil 14b.

Inverter 11 converts DC power input from the battery 230 side into high-frequency AC power. Insulating circuit 14 transforms the output (AC power) of inverter 11 in accordance with a coil turn ratio, and transmits the transformed AC power to inverter 12. Inverter 12 rectifies the AC power received from insulating circuit 14, and outputs the rectified power to inverter 13. Inverter 13 converts the DC power received from inverter 12 into AC power having a prescribed frequency, and outputs the AC power to the inlet 210 side.

As described above, AC inverter 221 is configured to convert the DC power input from the battery 230 side into AC power having a prescribed frequency, and output the AC power to the inlet 210 side. The circuit configuration shown in FIG. 3 is one example and can be changed as appropriate. An arbitrary circuit configuration of a known vehicle-mounted inverter may be used. AC inverter 221 may be configured to allow bidirectional power conversion between battery 230 and inlet 210, or may be configured to allow power conversion in only one direction (direction from battery 230 to inlet 210).

Referring again to FIG. 2, AC inverters 221A and 221B are provided with monitoring units 224A and 224B, respectively. Monitoring units 224A and 224B include various sensors that detect states (e.g., voltages, currents and temperatures) of AC inverters 221A and 221B, respectively, and output the detection results to ECU 250. Based on the outputs of monitoring units 224A and 224B, ECU 250 controls AC inverters 221A and 221B. Thus, electric power output from each inverter to inlet 210 (i.e., discharging power of charging and discharging device 220) is adjusted. ECU 250 may be configured to monitor a current of each of AC inverters 221A and 221B, and perform current limitation on the inverter whose current is likely to exceed a prescribed permissible current value (e.g., 15 A). Details of a wiring between each inverter and inlet 210 will be described below (see FIG. 8).

ECU 250 can disconnect AC inverters 221A and 221B from inlet 210 by bringing discharging relays 223A and 223B into the disconnected state, respectively. In the present embodiment, the discharging relay is provided for each inverter. Therefore, each inverter can be individually disconnected from inlet 210. When the discharging relay enters the disconnected state, discharging from the inverter corresponding to this discharging relay to inlet 210 is prohibited. The number of discharging relays is arbitrary. The discharging relays may be arranged to collectively disconnect a plurality of inverters from the inlet.

Each of AC inverters 221A and 221B may be configured to adjust the frequency of the AC power such that AC power having a frequency set initially (e.g., at the time of shipment) is output. Alternatively, ECU 250 may control AC inverters 221A and 221B based on the location of vehicle 200 such that AC power having an appropriate frequency for each region is output from each inverter. ECU 250 may be configured such that a user can set an arbitrary frequency.

A charging relay 223C is provided between charger 222 and battery 230 (more particularly, on the charger 222 side relative to SMR 231). Charging relay 223C is configured to switch between connection and disconnection of a charging path extending from charger 222 to battery 230. When charging relay 223C enters the disconnected state, supply of electric power from inlet 210 through charger 222 to battery 230 is prohibited.

Figure 4:
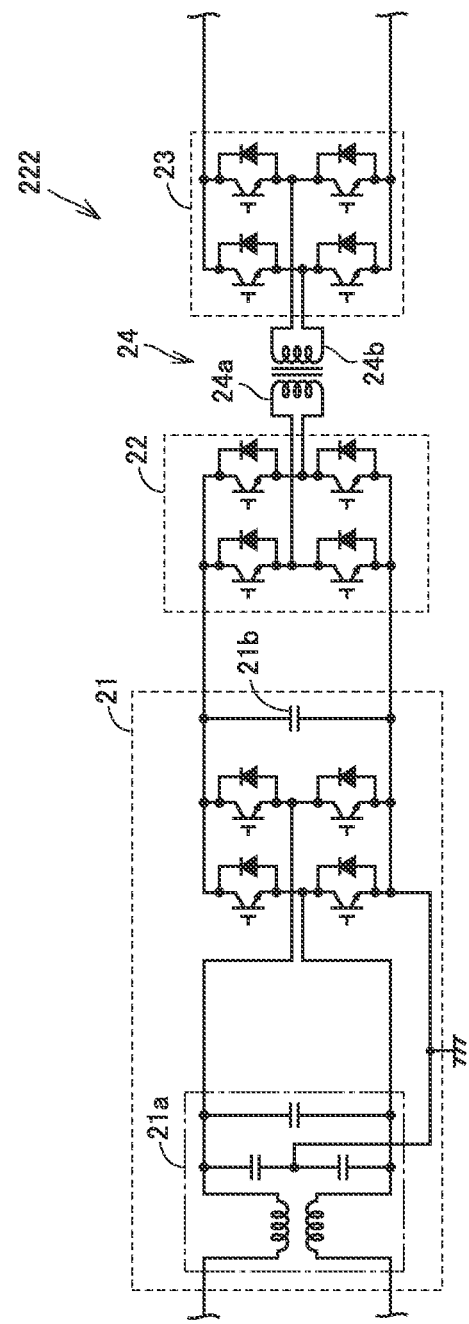
FIG. 4 shows a circuit configuration example of a vehicle-mounted charger shown in FIG. 2.

FIG. 4 shows a circuit configuration example of charger 222. Referring to FIG. 4 together with FIG. 2, charger 222 includes inverters 21 to 23 and an insulating circuit 24. Each of inverters 21 to 23 includes a full-bridge circuit including four switching elements. Of inverters 21 to 23, inverter 21 located closest to inlet 210 further includes a filter circuit 21a and a smoothing capacitor 21b. Filter circuit 21a removes high-frequency noise included in the AC power. Each switching element included in inverters 21 to 23 is controlled by ECU 250. Insulating circuit 24 is an insulating transformer including a first coil 24a and a second coil 24b.

Inverter 21 rectifies AC power input from the inlet 210 side, and outputs the rectified power to inverter 22. Inverter 22 converts the DC power received from inverter 21 into high-frequency AC power. Insulating circuit 24 transforms the output (AC power) of inverter 22 in accordance with a coil turn ratio, and transmits the transformed AC power to inverter 23. Inverter 23 rectifies the AC power received from insulating circuit 24, and outputs the rectified power to the battery 230 side.

As described above, charger 222 is configured to convert the AC power input from the inlet 210 side into DC power, and output the DC power to the battery 230 side. The circuit configuration shown in FIG. 4 is one example and can be changed as appropriate. Charger 222 may be configured to allow bidirectional power conversion between battery 230 and inlet 210, or may be configured to allow power conversion in only one direction (direction from inlet 210 to battery 230). Charger 222 that allows bidirectional power conversion can be used as a power conversion circuit for discharging. Therefore, in the configuration in which charger 222 is configured to allow bidirectional power conversion, either AC inverter 221A or AC inverter 221B may be omitted and charger 222 may be used instead.

Referring again to FIG. 2, charger 222 is provided with a monitoring unit 224C. Monitoring unit 224C includes various sensors that detect a state (e.g., a voltage, a current and a temperature) of charger 222, and outputs the detection results to ECU 250. Based on the output of monitoring unit 224C, ECU 250 controls charger 222. Thus, electric power output from charger 222 to battery 230 (i.e., charging power of battery 230) is adjusted.

Figure 5:
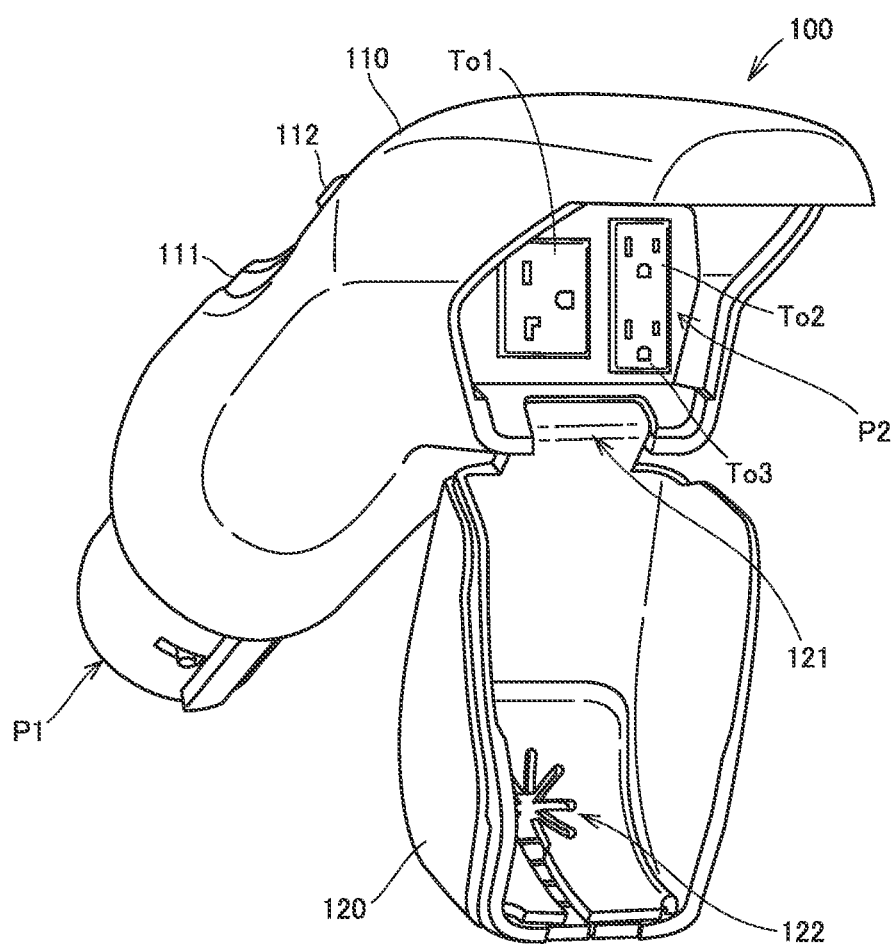
FIG. 5 shows an outer appearance of a discharging connector shown in FIG. 1, with a cover thereof being open.
Figure 6:
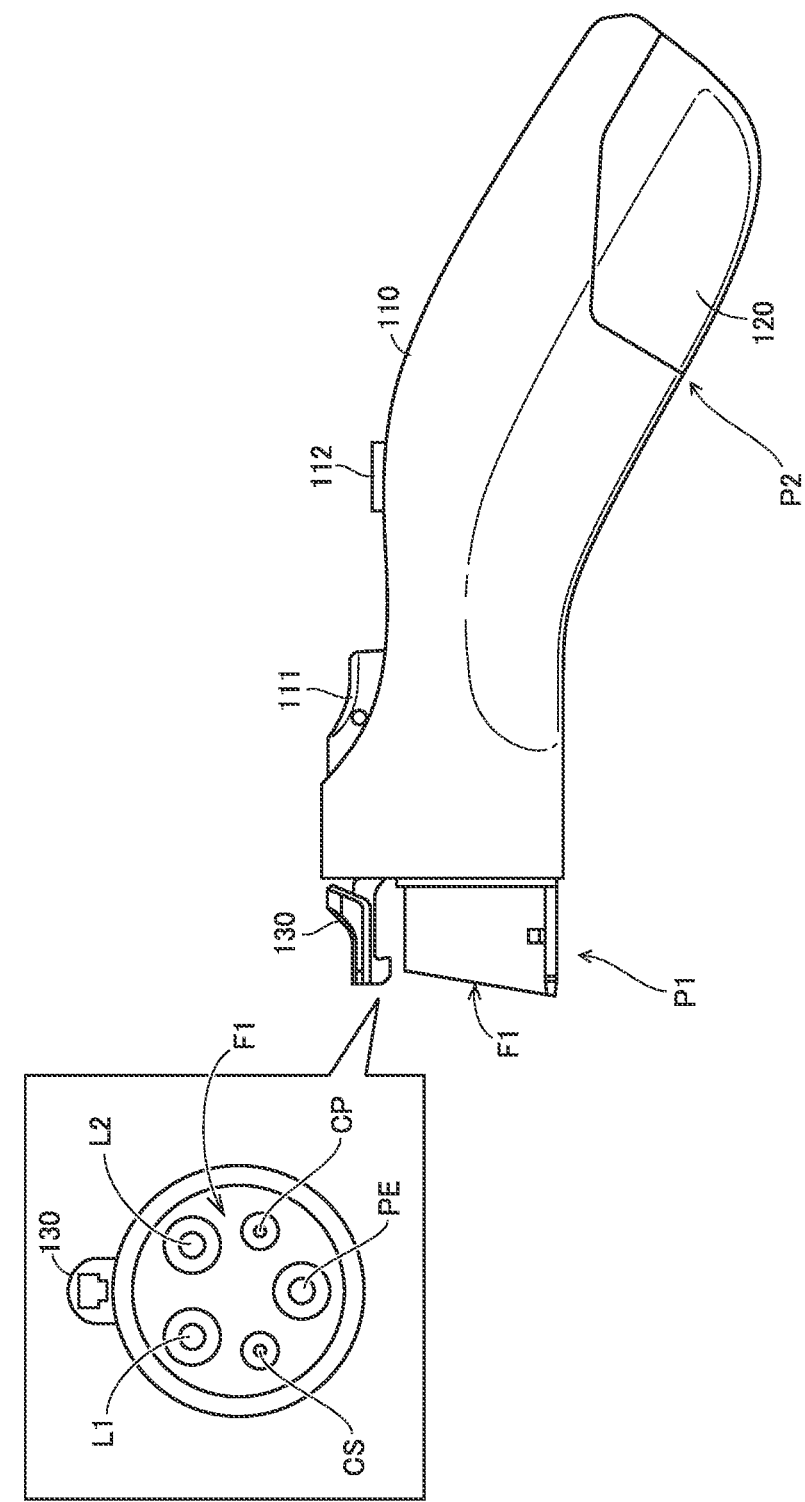
FIG. 6 shows an outer appearance of the discharging connector shown in FIG. 1, with the cover thereof being closed.

Discharging connector 100 shown in FIG. 1 corresponds to a portion of the coupling system for discharging that is connected to inlet 210. A structure of discharging connector 100 will be described below with reference to FIGS. 5 and 6. FIG. 5 shows an outer appearance of discharging connector 100, with a cover 120 being open. FIG. 6 shows an outer appearance of discharging connector 100, with cover 120 being closed.

Referring to FIGS. 5 and 6, discharging connector 100 includes first end P1 and second end P2. First end P1 and second end P2 are located at both ends of a main body portion 110 of discharging connector 100. First end P1 is configured to be connectable to inlet 210 of vehicle 200. Second end P2 includes an electrical outlet To1, an electrical outlet To2 and an electrical outlet To3.

Discharging connector 100 further includes cover 120 configured to be capable of opening and closing second end P2. Cover 120 is pivotably attached to main body portion 110 of discharging connector 100. Specifically, cover 120 is attached to main body portion 110 through a rotating mechanism 121 (e.g., hinge). Cover 120 covers second end P2 in the closed state, and exposes second end P2 in the open state. Cover 120 is provided with a hole 122 through which a cord (e.g., power cord 320 shown in FIG. 1) is inserted. Hole 122 includes a central hole, and a plurality of slits extending radially around the central hole. Hole 122 receives the plurality of cords. By inserting three cords into hole 122, cover 120 can be closed even in a state where a plug of each cord is inserted into each of electrical outlets To1 to To3. In the closed state of cover 120 (see FIG. 6), exposure of electrical outlets To1 to To3 to rain and wind is suppressed. Cover 120 has a waterproofing property. Main body portion 110 and cover 120 may be subjected to waterproofing treatment. A seal member may be provided at a portion of cover 120 that comes into contact with main body portion 110 when cover 120 is closed. A structure for protecting electrical outlets To1 to To3 against rainfall may be a structure defined in 6.12 of the standard "JIS C8303:2007".

As shown in FIG. 6, first end P1 includes a connector terminal at an end face F1. End face F1 of first end P1 of discharging connector 100 corresponds to a surface (connection surface) connected to inlet 210 of vehicle 200 (FIG. 2). The connector terminal provided at end face F1 includes a terminal L1, a terminal L2, a terminal PE, a terminal CS, and a terminal CP.

Terminals L1 and L2 correspond to two terminals to which AC power is input from vehicle 200. Terminal L1 is a HOT-side terminal, and terminal L2 is a COLD-side terminal. Terminals L1 and L2 at end face F1 correspond to examples of "first input terminal" and "second input terminal" according to the present disclosure, respectively. Hereinafter, terminal L1 will also be denoted as "AC1", and terminal L2 will also be denoted as "AC2". Terminal PE corresponds to a ground terminal (hereinafter, also denoted as "GND"). Terminal CS corresponds to a terminal (hereinafter, also denoted as "PISW") for detection (proximity detection) of a state (connected state/fitted state/non-fitted state) of discharging connector 100 and inlet 210. Hereinafter, the state of discharging connector 100 and inlet 210 will also be referred to as "connector state". Terminal CS outputs, to the vehicle 200 side, a potential signal (hereinafter, also referred to as "PISW signal") indicating the connector state. Terminal CP corresponds to a terminal (hereinafter, also denoted as "CPLT") for a control pilot (CPLT) signal defined in, for example, the standard "IEC/TS 62763:2013". The CPLT signal is a pulse width modulation (PWM) signal used for communication between vehicle 200 and discharging connector 100.

Inlet 210 includes terminals corresponding to the above-described terminals (terminals L1, L2, PE, CS, and CP) of discharging connector 100. Hereinafter, in order to clarify the correspondence relationship between the terminals of discharging connector 100 and the terminals of inlet 210, the terminals of inlet 210 corresponding to terminals L1, L2, PE, CS, and CP of discharging connector 100 will also be referred to as "AC1", "AC2", "GND", "PISW", and "CPLT", respectively. In a state where discharging connector 100 and inlet 210 are fitted to each other, AC1, AC2, GND, PISW, and CPLT provided at first end P1 of discharging connector 100 are in contact with AC1, AC2, GND, PISW, and CPLT of inlet 210, respectively. PISW of inlet 210 is configured to output, to ECU 250 (FIG. 2), a potential signal indicating information about the discharging assembly (discharging connector) connected to inlet 210. The information about the discharging assembly includes a requested voltage value of the discharging assembly and a type of an electrical outlet of the discharging assembly. Thus, ECU 250 is configured to obtain the requested voltage value of the discharging assembly connected to inlet 210 and the type of the electrical outlet of the discharging assembly connected to inlet 210. PISW of inlet 210 corresponds to an example of "detection terminal" according to the present disclosure. The terminals of discharging connector 100 and the structure for fitting to inlet 210 may conform to, for example, Type 1 defined in the standard "IEC62196-2: 2011".

Discharging connector 100 further includes an unlatch button 111, a discharging start switch 112 and a latch 130.

Unlatch button 111 has the function of unlatching discharging connector 100 from inlet 210, and causing vehicle 200 (e.g., ECU 250) to sense the connector state (connected state/fitted state/non-fitted state). Latch 130 is configured to engage with inlet 210 and fix (latch) discharging connector 100 to inlet 210. For example, when a tip of latch 130 is caught in a recessed portion formed in inlet 210, discharging connector 100 is latched. Latch 130 works in conjunction with unlatch button 111. When unlatch button 111 is pressed by the user, latching is released.

When the user inserts discharging connector 100 into inlet 210 and fits discharging connector 100 and inlet 210 to each other without pressing unlatch button 111, discharging connector 100 and inlet 210 are fixed by latch 130, with discharging connector 100 and inlet 210 being electrically connected to each other. This connector state corresponds to "connected state". In the connected state, discharging connector 100 is inserted into inlet 210, and all terminals of discharging connector 100 and inlet 210 are electrically connected, and discharging connector 100 is latched. When the user presses unlatch button 111 in the connected state, fixation by latch 130 is released. This connector state corresponds to "fitted state". In the fitted state, although discharging connector 100 is inserted into inlet 210 and all terminals of discharging connector 100 and inlet 210 are electrically connected, discharging connector 100 is not latched. When the user pulls out discharging connector 100 from inlet 210 in the fitted state, the connector state enters "non-fitted state". The non-fitted state is a state other than the connected state and the fitted state. When the connector state is the connected state or the fitted state, traveling of vehicle 200 is prohibited by ECU 250.

Discharging start switch 112 has the function of changing the PISW signal to thereby cause vehicle 200 (e.g., ECU 250) to sense the start of discharging. In the present embodiment, the PISW signal is the potential signal. Details of the PISW signal will be described below (see FIG. 13).

First end P1 and second end P2 of discharging connector 100 shown in FIG. 1 are connected to each other by a single-phase three-line-type wiring L10. Single-phase three-line-type wiring L10 includes a voltage line L11, a voltage line L12 and a neutral line L13. Voltage line L11, voltage line L12 and neutral line L13 correspond to examples of "first voltage line", "second voltage line" and "neutral line" according to the present disclosure, respectively. Voltage lines L11 and L12 and neutral line L13 are provided to extend from first end P1 to second end P2, and connect first end P1 and second end P2 to each other. Second end P2 is configured to output electric power of AC 100 V and AC 200 V through voltage lines L11 and L12 and neutral line L13. A manner of connection between single-phase three-line-type wiring L10 and electrical outlets To1 to To3 will be described below (see FIG. 8).

Figure 7:
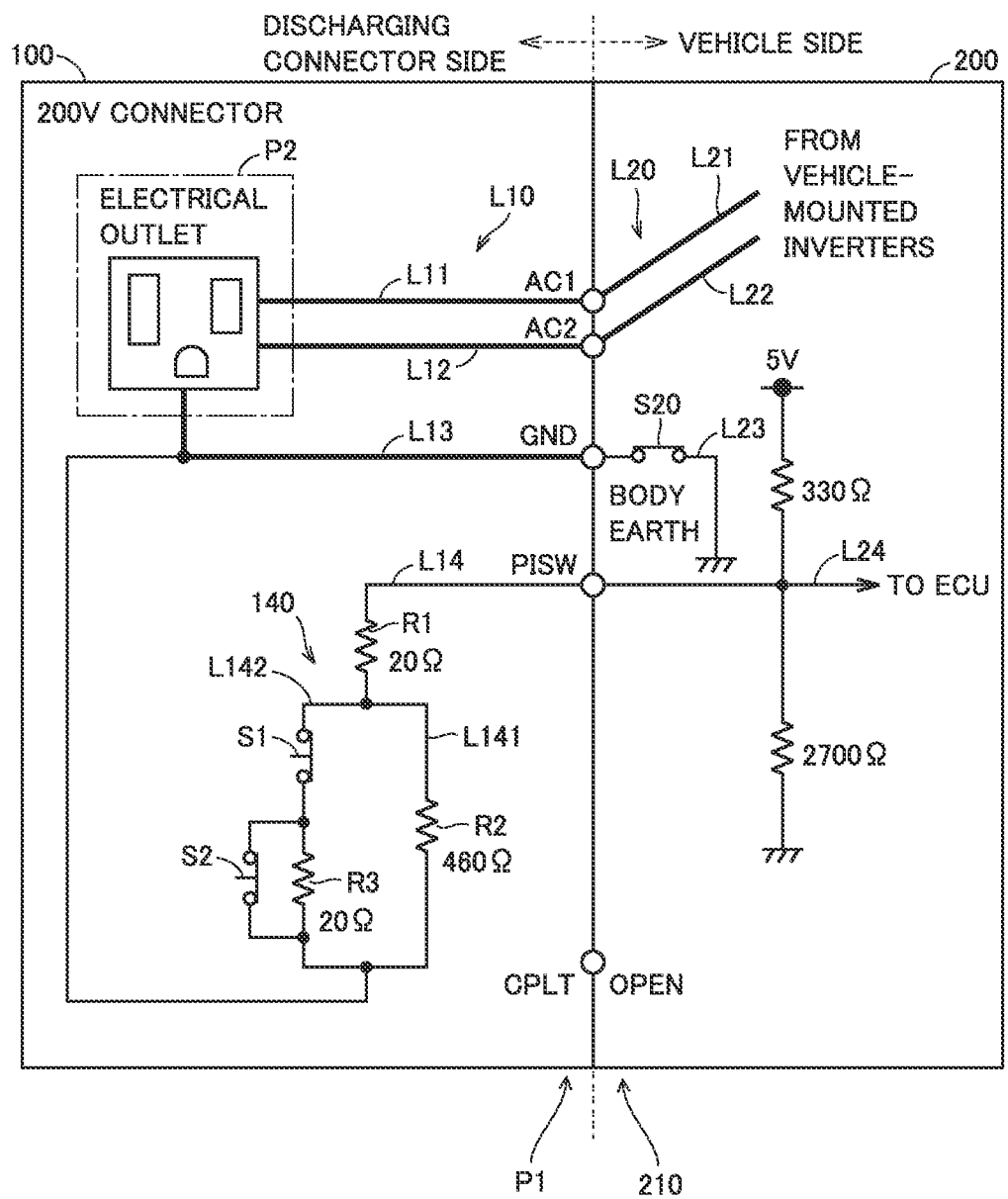
FIG. 7 shows a schematic circuit configuration of a 200V connector and a vehicle inlet shown in FIG. 1.

FIG. 7 shows a schematic circuit configuration of discharging connector 100 and inlet 210. Referring to FIG. 7 together with FIGS. 2 and 6, in discharging connector 100, voltage line L11, voltage line L12 and neutral line L13 are connected to AC1, AC2 and GND at first end P1, respectively. Single-phase three-line-type wiring L10 (i.e., voltage lines L11 and L12 and neutral line L13) of discharging connector 100 is connected to a single-phase three-line-type wiring L20 (i.e., voltage lines L21 and L22 and a neutral line L23) of vehicle 200 through AC1, AC2 and GND. In vehicle 200, voltage line L21, voltage line L22 and neutral line L23 are connected to AC1, AC2 and GND of inlet 210, respectively. AC1, AC2 and GND of inlet 210 correspond to examples of "first output terminal", "second output terminal" and "ground terminal" according to the present disclosure, respectively.

Each of AC1 and AC2 of inlet 210 is not grounded to the body of vehicle 200. Namely, voltage lines L21 and L22 are in a state of being insulated from the body of vehicle 200 (floating state). In vehicle 200, voltage lines L21 and L22 are supplied with AC power from the vehicle-mounted inverters (e.g., AC inverters 221A and 221B shown in FIG. 2). The AC power supplied from the vehicle-mounted inverters to voltage lines L21 and L22 is then transmitted to voltage lines L11 and L12 through AC1 and AC2.

In vehicle 200, GND of inlet 210 is connected to the body of vehicle 200 through a neutral line L23. However, neutral line L23 is provided with a switch S20 (ground switch) that switches a conduction state and an insulated state between GND of inlet 210 and the body of vehicle 200. Switch S20 is controlled by ECU 250 (FIG. 2). When switch S20 is in the closed state (conduction state), GND of inlet 210 is grounded to the body of vehicle 200 (body earth). When switch S20 enters the open state (insulated state), GND of inlet 210 is electrically disconnected from the body of vehicle 200. In the present embodiment, a normally-on switch is used as switch S20. Although details will be described below, GND of inlet 210 is usually grounded to the body of vehicle 200, and is electrically disconnected from the body of vehicle 200 before discharging is performed on a discharging connector including a one-terminal-type electrical outlet described below. In some embodiments, the switch S20 may be a normally-off switch.

Although FIG. 7 shows only one electrical outlet, discharging connector 100 includes three electrical outlets (electrical outlets To1 to To3 shown in FIG. 5). In the present embodiment, the type of the electrical outlet of the discharging assembly (e.g., discharging connector 100) connected to inlet 210 is classified into a first electrical outlet that outputs an AC voltage to be applied between AC1 and AC2 of inlet 210, a second electrical outlet that outputs an AC voltage to be applied between AC1 and GND of inlet 210, and a third electrical outlet that outputs an AC voltage to be applied between AC2 and GND of inlet 210. Hereinafter, the first electrical outlet may be referred to as "two-terminal-type electrical outlet". The second electrical outlet and the third electrical outlet may be collectively referred to as "one-terminal-type electrical outlet" in order to be distinguished from the first electrical outlet (two-terminal-type electrical outlet). The discharging assembly including the one-terminal-type electrical outlet means that the discharging assembly includes at least one of the second electrical outlet and the third electrical outlet.

Figure 8:
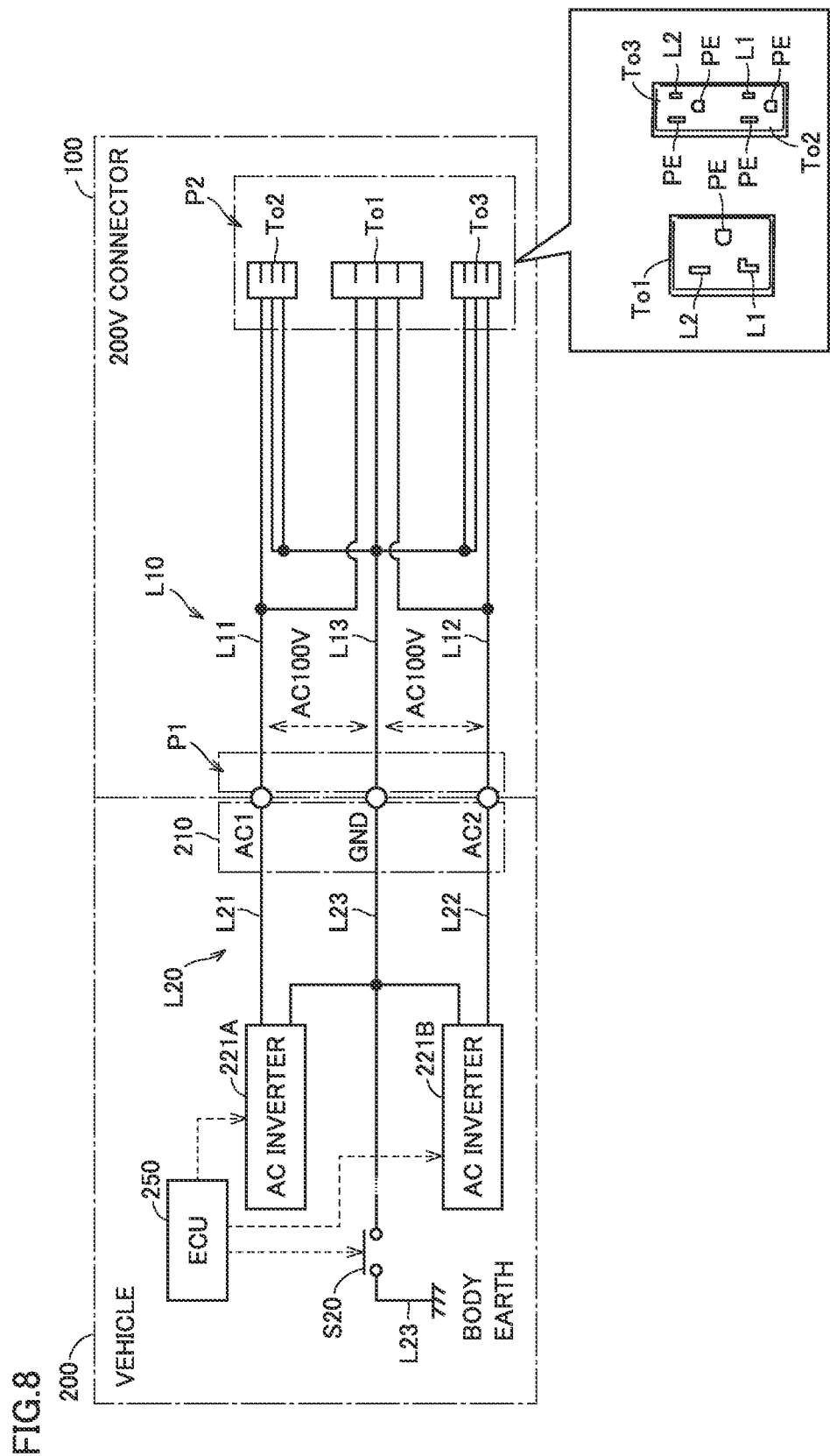
FIG. 8 shows a manner of connection between single-phase three-line-type wirings in the 200V connector and a vehicle shown in FIG. 1.

FIG. 8 shows a manner of connection between single-phase three-line-type wirings L10 and L20 in discharging connector 100 and vehicle 200. Referring to FIG. 8 together with FIGS. 2, 5 and 7, AC1 and GND of inlet 210 are connected to AC inverter 221A through voltage line L21 and neutral line L23, respectively. AC2 and GND of inlet 210 are connected to AC inverter 221B through voltage line L22 and neutral line L23, respectively. GND of inlet 210 is connected to the body of vehicle 200 via switch S20.

Each of AC inverters 221A and 221B is configured to receive the DC power supplied from battery 230 (FIG. 2) and output the AC power to the inlet 210 side. Between AC1 and GND in inlet 210, first AC power is output from battery 230 through AC inverter 221A. Between AC2 and GND in inlet 210, second AC power is output from battery 230 through AC inverter 221B.

The electric power (e.g., the above-described first AC power and second AC power) is input to first end P1 of discharging connector 100 from inlet 210 connected to first end P1. The first AC power and the second AC power are input from inlet 210 to first end P1, and is transmitted through voltage lines L11 and L12 and neutral line L13 to second end P2. Second end P2 outputs the first AC power and the second AC power to electrical outlets To1 to To3 through voltage lines L11 and L12 and neutral line L13. In the present embodiment, the first AC power applies a voltage of AC 100 V between voltage line L11 and neutral line L13, and the second AC power applies a voltage of AC 100 V between voltage line L12 and neutral line L13. As to discharging connector 100, electrical outlet terminals (receptacle terminals) electrically connected to voltage line L11, voltage line L12 and neutral line L13 are denoted as "L1", "L2" and "PE", respectively.

As shown in FIG. 8, electrical outlet To1 includes L1 (first voltage terminal), L2 (second voltage terminal) and PE (ground terminal). Electrical outlet To2 includes one L1 (voltage terminal) and two PEs (ground terminals). Electrical outlet To3 includes one L2 (voltage terminal) and two PEs (ground terminals). When switch S20 is in the closed state, PE (neutral line L13) has the same potential as that of the body of vehicle 200.

In the present embodiment, electrical outlet To1 outputs AC 200 V between L1 and L2. Electrical outlet To2 outputs AC 100 V between L1 and PE. Electrical outlet To3 outputs AC 100 V between L2 and PE. Electrical outlet To1 may be an electrical outlet for single-phase AC 200 V having a rated voltage of 250 V and a rated current of 20 A. Each of electrical outlet To2 and electrical outlet To3 may be an electrical outlet for single-phase AC 100 V having a rated voltage of 125 V and a rated current of 15 A. Of electrical outlets To1 to To3, electrical outlet To1 corresponds to the first electrical outlet, electrical outlet To2 corresponds to the second electrical outlet, and electrical outlet To3 corresponds to the third electrical outlet. Discharging connector 100 includes one two-terminal-type electrical outlet and two one-terminal-type electrical outlets.

As described above, AC 100 V/AC 200 V can be output by single-phase three-line-type wiring L10. For example, when a driving voltage of electrical device 310 shown in FIG. 1 is AC 200 V, electrical device 310 can be driven by connecting power cord 320 to electrical outlet To1. When the driving voltage of electrical device 310 shown in FIG. 1 is AC 100 V, electrical device 310 can be driven by connecting power cord 320 to electrical outlet To2 or electrical outlet To3. A plurality of types of electrical devices having different driving voltages can also be driven by using a plurality of electrical outlets simultaneously.

Referring again to FIG. 7 together with FIGS. 2 and 6, in vehicle 200, a reference voltage is applied between the vehicle body (ground) and a signal line L24, and signal line L24 is connected to PISW. The PISW signal (PISW potential) is input to ECU 250 through signal line L24. When first end P1 of discharging connector 100 and inlet 210 are electrically connected to each other, a closed circuit (closed system) is formed such that PISW and GND are connected to each other with a circuit of discharging connector 100 (including a detection circuit 140 described below) interposed therebetween. Thus, the potential of PISW changes. Even if discharging connector 100 does not include a power supply, the PISW signal is generated by the above-described closed circuit. ECU 250 can determine the connector state based on the PISW signal (PISW potential).

In discharging connector 100, a signal line L14 connected to PISW is connected to neutral line L13 with detection circuit 140 interposed therebetween. Detection circuit 140 is a circuit (proximity detection circuit) for determining whether discharging connector 100 is in the connected state, in the fitted state or in the non-fitted state. Detection circuit 140 includes electric resistances R1, R2 and R3, and switches S1 and S2. Signal line L14 extends from PISW through electric resistance R1 and branches off into two branch lines L141 and L142, and branch lines L141 and L142 join to be connected to neutral line L13. Electric resistance R2 is arranged on branch line L141, and electric resistance R3 and switch S1 are arranged on branch line L142. Electric resistance R2 and electric resistance R3 are arranged in parallel. Electric resistance R3 and switch S1 are arranged in series. Switch S2 is arranged in parallel with electric resistance R3.

Switches S1 and S2 are opened and closed in conjunction with unlatch button 111 and discharging start switch 112 (FIGS. 5 and 6) of discharging connector 100, respectively. Switch S1 is in the closed state (conduction state) when unlatch button 111 is OFF, and is in the open state (cut-off state) when unlatch button 111 is ON. Switch S2 is in the closed state (conduction state) when discharging start switch 112 is OFF, and is in the open state (cut-off state) when discharging start switch 112 is ON. In the present embodiment, discharging start switch 112 is ON while the user is pressing discharging start switch 112, and discharging start switch 112 is turned off when the user stops pressing discharging start switch 112. When the user does not operate unlatch button 111 and discharging start switch 112, switches S1 and S2 are both in the closed state. Namely, each of switches S1 and S2 corresponds to a normally-on switch.

When switches S1 and S2 enter the open state, a resistance value (combined resistance) of detection circuit 140 becomes larger than that when switches S1 and S2 are in the closed state, which causes the potential of PISW to rise. ECU 250 can determine the state of each of switches S1 and S2 (and in turn, the state of each of unlatch button 111 and discharging start switch 112) based on the PISW signal (PISW potential).

In discharging connector 100 shown in FIGS. 5 and 6, unlatch button 111 functions as a switch for stopping discharging from vehicle 200, and discharging start switch 112 functions as a switch for starting discharging from vehicle 200. When the user performs a prescribed operation on discharging start switch 112, with the connector state being in the connected state, vehicle 200 (ECU 250) recognizes the start of discharging and starts discharging. In the present embodiment, when the user turns on discharging start switch 112 twice, discharging is started. When unlatch button 111 is pressed during discharging and the connector state enters the fitted state or the non-fitted state, vehicle 200 (ECU 250) recognizes the stop of discharging and stops discharging.

Figure 9:
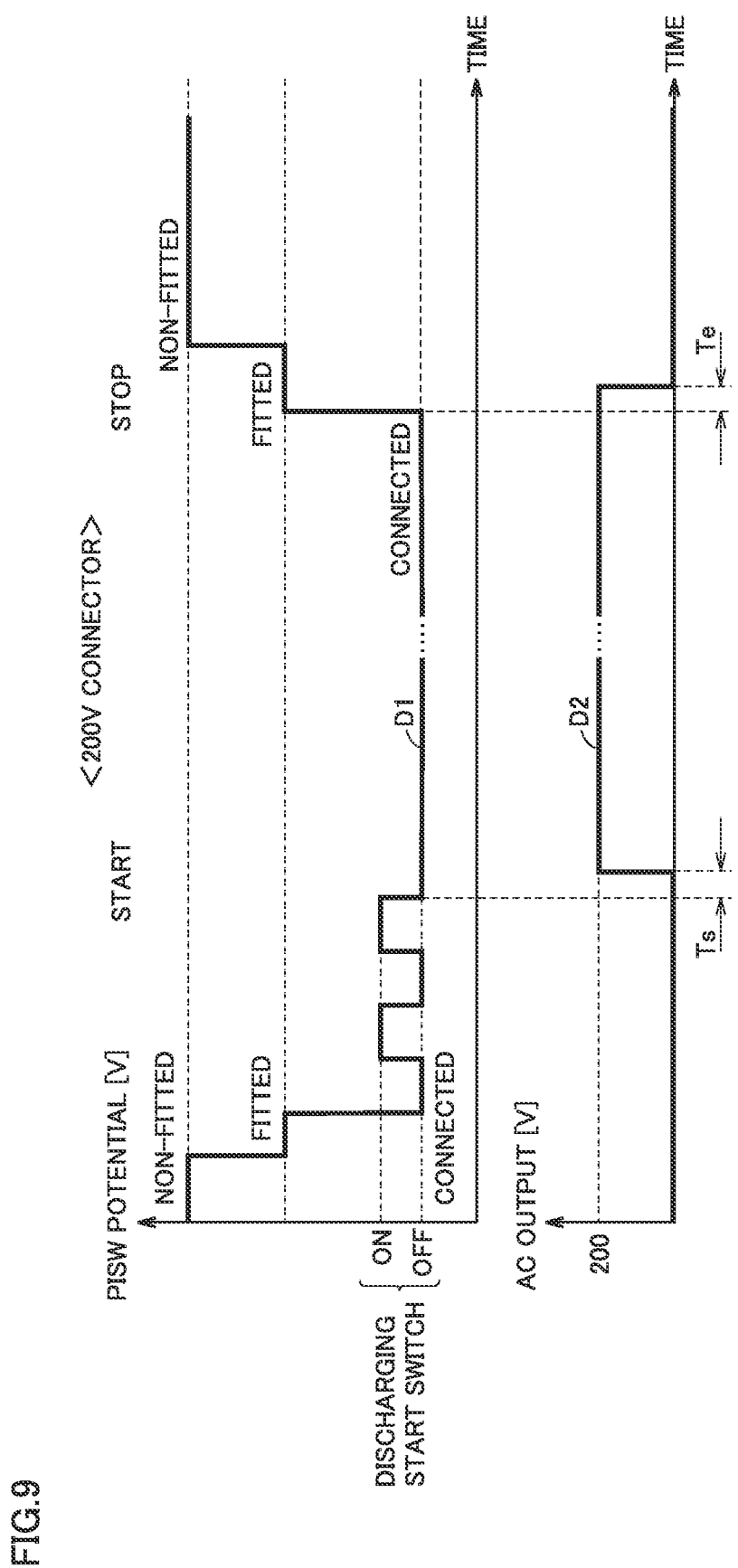
FIG. 9 is a time chart showing a sequence of start (start of discharging) and stop (stop of discharging) of the 200V connector shown in FIG. 1.

FIG. 9 is a time chart showing a sequence of start (start of discharging) and stop (stop of discharging) of discharging connector 100. In FIG. 9, a line D1 indicates the potential of PISW, and a line D2 indicates the AC power output from inlet 210 to the discharging connector 100 side.

Referring to FIG. 9 together with FIGS. 5 to 8, when the user inserts discharging connector 100 into inlet 210 while the user is pressing unlatch button 111, the connector state is switched from the non-fitted state to the fitted state and the potential of PISW falls. Thereafter, when the user stops pressing unlatch button 111, the connector state is switched from the fitted state to the connected state and the potential of PISW further falls. When a prescribed time period (e.g., 500 ms) has elapsed since the connector state entered the connected state, the operation of discharging start switch 112 becomes effective. Then, when the user turns on discharging start switch 112, the potential of PISW rises. Thereafter, when the user returns discharging start switch 112 to the OFF state, the potential of PISW also returns. When the user operates discharging start switch 112 in the order shown in FIG. 9, i.e., in the order of ON, OFF, ON, and OFF, with the connector state being in the connected state, ECU 250 (FIG. 2) recognizes the start of discharging based on the potential of PISW, and starts discharging. In order to suppress malfunction caused by noise, the recognition of discharging start switch 112 by ECU 250 becomes effective when the voltage corresponding to the ON/OFF operation continues for a prescribed time period (e.g., 50 ms to 3000 ms).

Discharging from vehicle 200 is performed by ECU 250. When vehicle 200 performs feeding of the AC power through discharging connector 100, switch S20 (FIG. 7) is switched from the closed state to the open state in a period Ts before the start of discharging. Thereafter, ECU 250 controls charging and discharging device 220 (FIG. 2) such that the above-described first AC power and second AC power are output from inlet 210 to the discharging connector 100 side. During discharging, SMR 231 (FIG. 2) is controlled to be in the closed state and switch S20 is controlled to be in the open state. Period Ts from the discharging start operation to the start of discharging can be arbitrarily set. ECU 250 may perform a prescribed process (e.g., pre-discharging inspection such as disconnection check) in period Ts. SMR 231 may be switched from the open state to the closed state in period Ts.

When unlatch button 111 is pressed during discharging, the connector state is switched from the connected state to the fitted state and the potential of PISW rises. When the connector state enters the fitted state, ECU 250 recognizes the stop of discharging based on the potential of PISW, and stops discharging. A period Te from the discharging stop operation to the stop of discharging may be a period defined in the standard "IEC61851-1".

Referring again to FIG. 7 together with FIGS. 2 and 6, the PISW signal (PISW potential) also indicates the requested voltage value of the discharging connector electrically connected to inlet 210, in addition to the connector state and the switch state described above. Specifically, inlet 210 is configured to be connectable to a plurality of types of discharging connectors. In the present embodiment, in addition to discharging connector 100 shown in FIGS. 5 to 9, a discharging connector 100A described below may also be connected to inlet 210. Discharging connector 100 and discharging connector 100A are different in requested voltage value. A requested voltage value of discharging connector 100 is 200 V, and a requested voltage value of discharging connector 100A is 100 V. Hereinafter, discharging connector 100 and discharging connector 100A are also referred to as "200V connector" and "100V connector", respectively.

Figure 10:
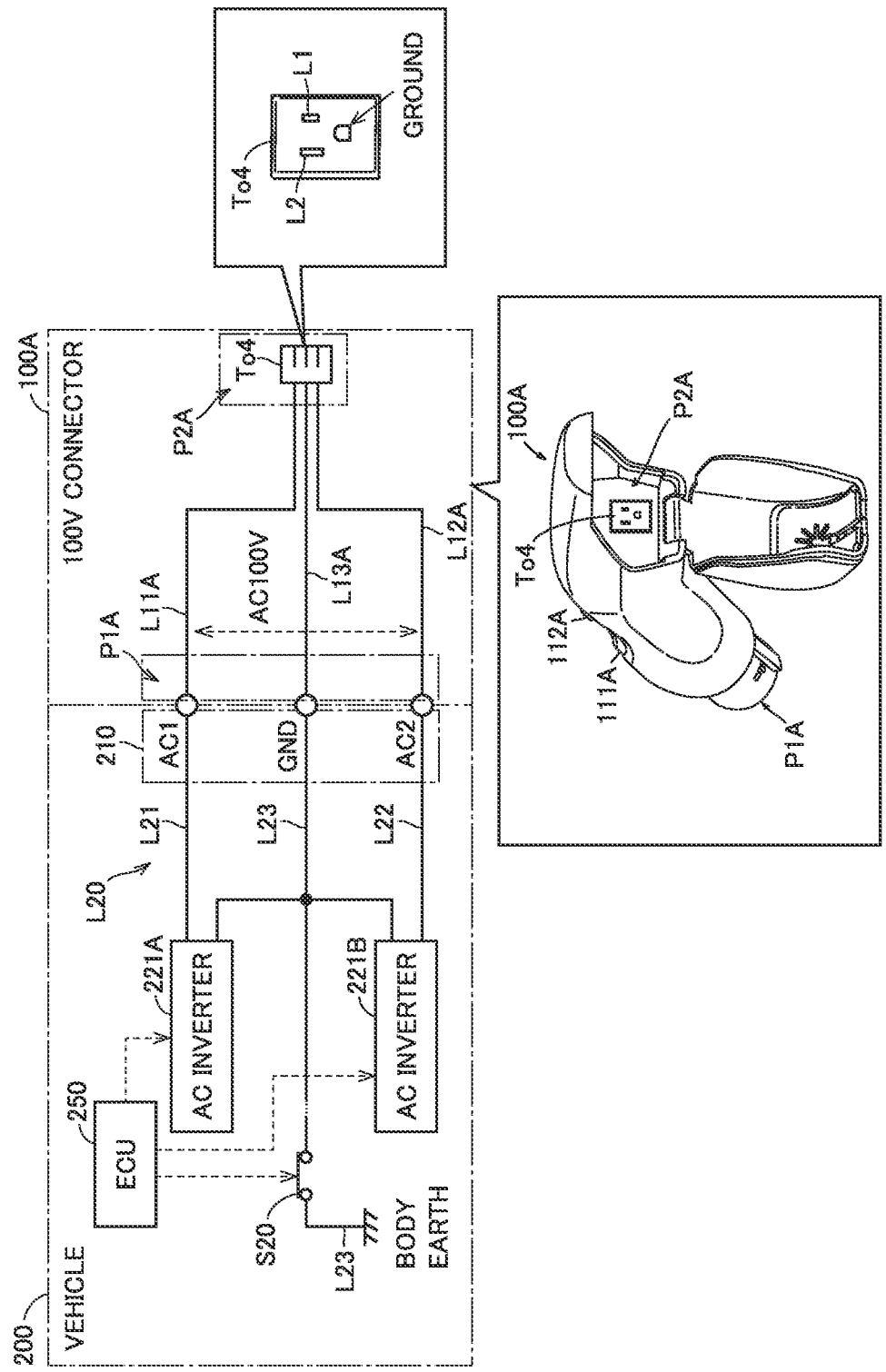
FIG. 10 is a diagram for illustrating a 100V connector connectable to the vehicle inlet shown in FIG. 1.

FIG. 10 is a diagram for illustrating the 100V connector. In the following, the 100V connector will be described, focusing on the difference from the 200V connector. Referring to FIG. 10, an outer appearance of discharging connector 100A is almost the same as that of discharging connector 100 (FIG. 5). However, discharging connector 100A includes one electrical outlet. Discharging connector 100A includes an unlatch button 111A and a discharging start switch 112A. Discharging connector 100A includes a first end P1A connectable to inlet 210. Discharging connector 100A also includes an electrical outlet To4 at a second end P2A.

In discharging connector 100A, first end P1A and electrical outlet To4 are connected to each other by a voltage line L11A, a voltage line L12A and a ground line L13A. Voltage line L11A and voltage line L12A are connected to AC1 and AC2 at first end PIA, respectively. Ground line L13A is connected to GND at first end PIA. In the present embodiment, when ECU 250 recognizes that discharging connector 100A is connected to inlet 210, ECU 250 controls AC inverters 221A and 221B such that an AC voltage of 100 V is applied between AC1 and AC2 of inlet 210. The single-phase AC power is input from inlet 210 connected to first end PIA to first end PIA of discharging connector 100A. This single-phase AC power applies a voltage of AC 100 V between voltage line L11A and voltage line L12A.

As to discharging connector 100A, electrical outlet terminals electrically connected to voltage line L11A and voltage line L12A are denoted as "L1" and "L2", respectively. As shown in FIG. 10, electrical outlet To4 includes L1, L2 and a ground terminal. Electrical outlet To4 outputs the single-phase AC power of 100 V between L1 and L2. Electrical outlet To4 corresponds to the first electrical outlet. Discharging connector 100A includes only a two-terminal-type electrical outlet and does not include a one-terminal-type electrical outlet. When discharging connector 100A is connected to inlet 210, the ground terminal of electrical outlet To4 is electrically connected to GND of inlet 210 through ground line L13A. Therefore, when switch S20 is in the closed state, the ground terminal of electrical outlet To4 is grounded to the body of vehicle 200 (body earth). However, in the case of the two-terminal-type electrical outlet, AC power (supplied power) is output to L1 and L2 (voltage lines L11A and L12A) that are in a floating state. Therefore, even when the ground terminal is body-earthed, noise from the body of vehicle 200 is less likely to be superimposed on the supplied power.

Figure 11:
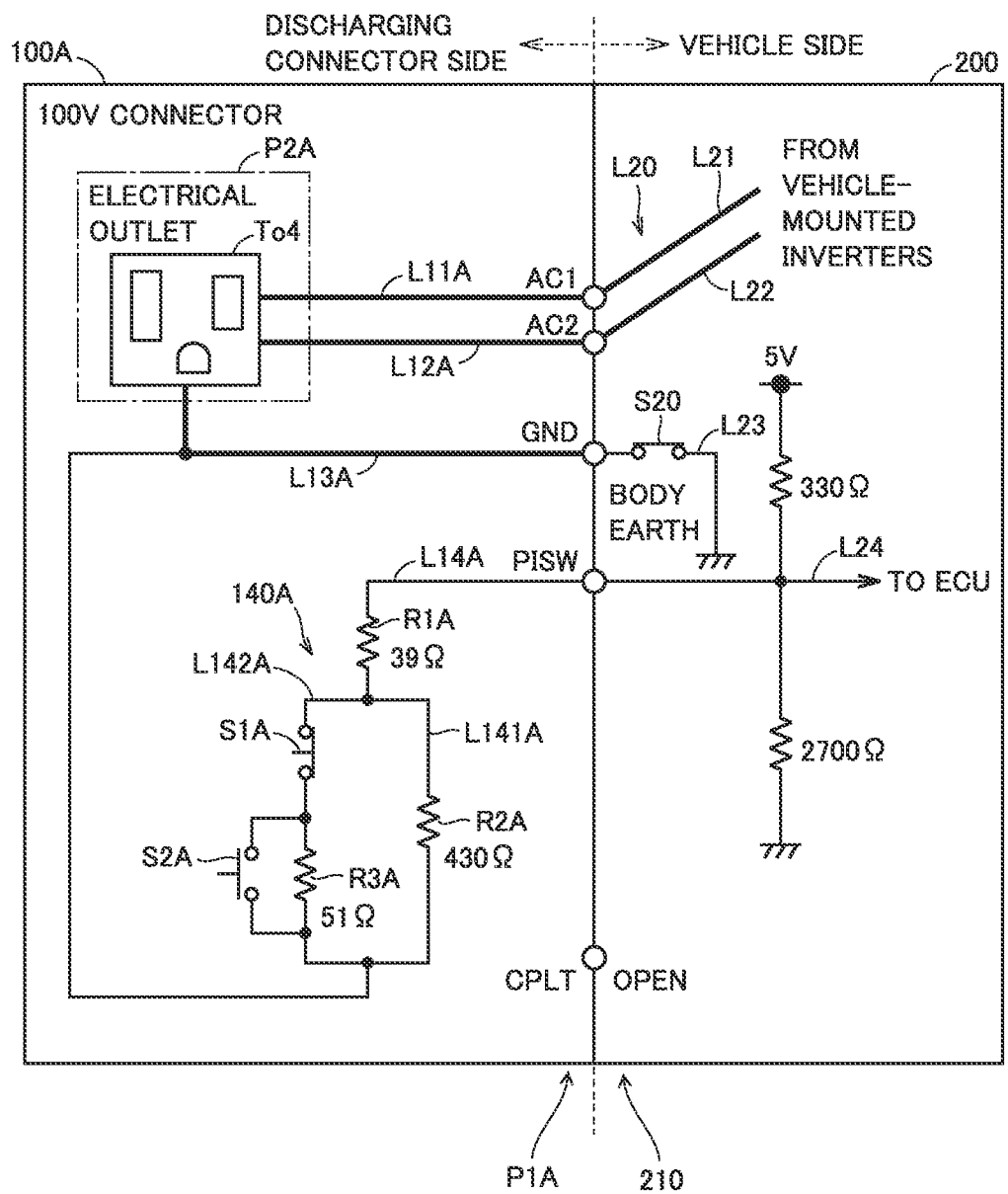
FIG. 11 shows a schematic circuit configuration of the 100V connector shown in FIG. 10.

FIG. 11 shows a schematic circuit configuration of the 100V connector. Referring to FIG. 11, in a state where discharging connector 100A is connected to inlet 210, a closed circuit is formed such that PISW and GND are connected to each other with a circuit of discharging connector 100A (including a detection circuit 140A) interposed therebetween. In vehicle 200, a reference voltage is applied between the vehicle body (ground) and PISW. Therefore, even if discharging connector 100A does not include a power supply, the PISW signal is generated by the above-described closed circuit. In addition, in discharging connector 100A, a signal line L14A connected to PISW is connected to the ground terminal of electrical outlet To4 with detection circuit 140A interposed therebetween. Detection circuit 140A includes electric resistances R1A, R2A and R3A, and switches S1A and S2A. Switches S1A and S2A are opened and closed in conjunction with unlatch button 111A and discharging start switch 112A (see FIG. 10), respectively. Signal line L14A extends from PISW through electric resistance R1A and branches off into two branch lines L141A and L142A, and branch lines L141A and L142A join to be connected to a ground line L13A. Although detection circuit 140A basically has a configuration similar to that of detection circuit 140 shown in FIG. 7, detection circuit 140A is different from detection circuit 140 in the following points.

Detection circuit 140 and detection circuit 140A are different in resistance value. As shown in FIG. 7, electric resistances R1, R2 and R3 in detection circuit 140 have resistance values of 20 Ω, 460Ω and 20Ω, respectively. In contrast, as shown in FIG. 11, electric resistances R1A, R2A and R3A in detection circuit 140A have resistance values of 39 Ω, 430Ω and 51Ω, respectively. Each resistance value in each of detection circuits 140 and 140A is set in accordance with a potential map M2 described below. In addition, each electric resistance included in detection circuits 140 and 140A is set at a resistance value different from that of each electric resistance in a charging connector defined in the standard "IEC61851-1:2010 Annex B". Thus, ECU 250 can distinguish between the charging connector and the discharging connector based on the PISW signal (PISW potential).

In detection circuit 140A, switch S1A is a normally-on switch, and switch S2A is a normally-off switch. Switch S2A is in the closed state when discharging start switch 112A is ON, and is in the open state when discharging start switch 112A is OFF.

Figure 12:
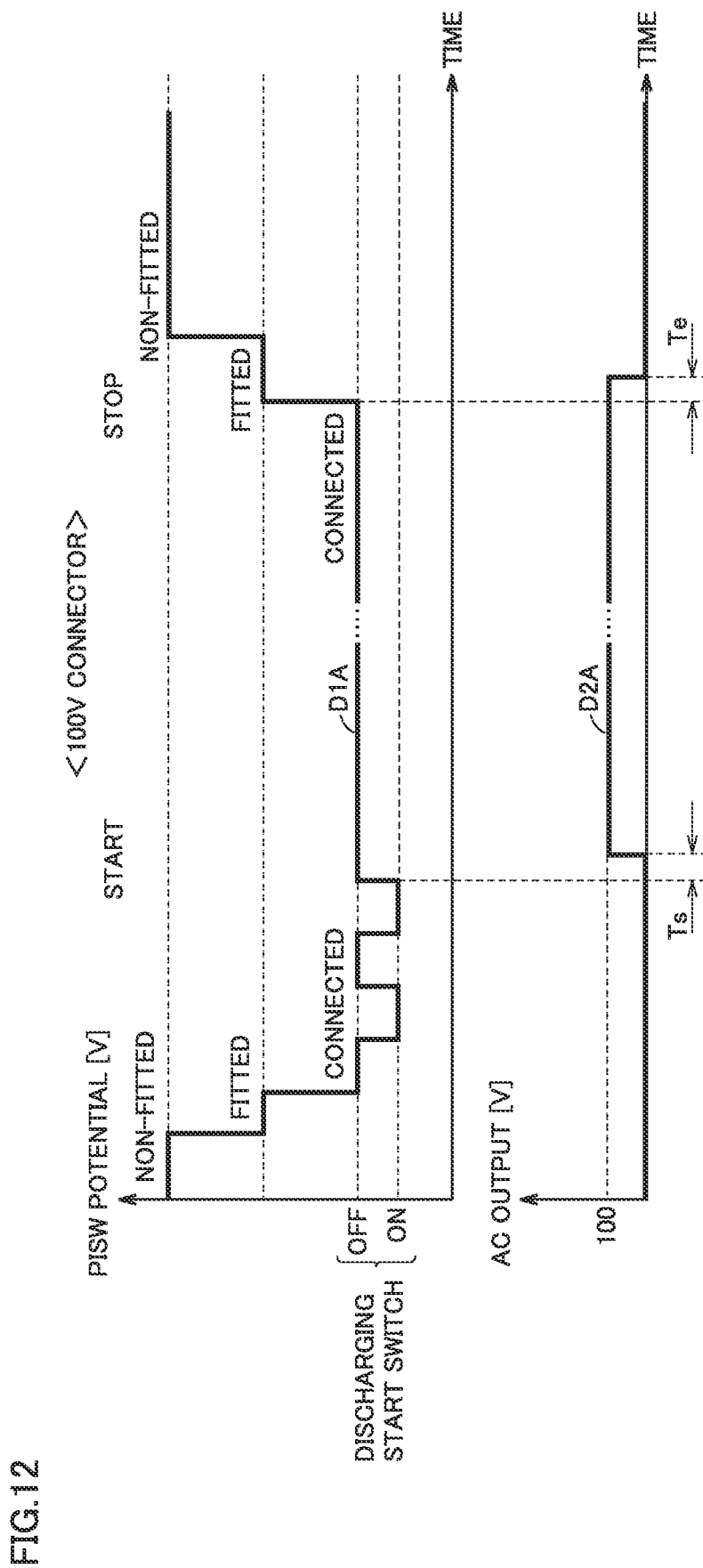
FIG. 12 is a time chart showing a sequence of start (start of discharging) and stop (stop of discharging) of the 100V connector shown in FIG. 10.

FIG. 12 is a time chart showing a sequence of start (start of discharging) and stop (stop of discharging) of the 100V connector. In FIG. 12, a line D1A indicates the potential of PISW, and a line D2A indicates the AC power output from inlet 210 to the discharging connector 100A side.

Referring to FIG. 12 together with FIGS. 10 and 11, the sequence of discharging connector 100A is basically similar to the sequence of discharging connector 100 shown in FIG. 9. However, when the user turns on discharging start switch 112A, the potential of PISW falls. When the user returns discharging start switch 112A to the OFF state, the potential of PISW also returns. When the user operates discharging start switch 112A in the order shown in FIG. 12, i.e., in the order of ON, OFF, ON, and OFF, with the connector state being in the connected state, ECU 250 (FIG. 2) recognizes the start of discharging based on the potential of PISW, and starts discharging. When vehicle 200 performs feeding of the AC power through discharging connector 100A, switch S20 (FIG. 11) is not switched before the start of discharging. During discharging, SMR 231 (FIG. 2) and switch S20 are both controlled to be in the closed state.

Figure 13:
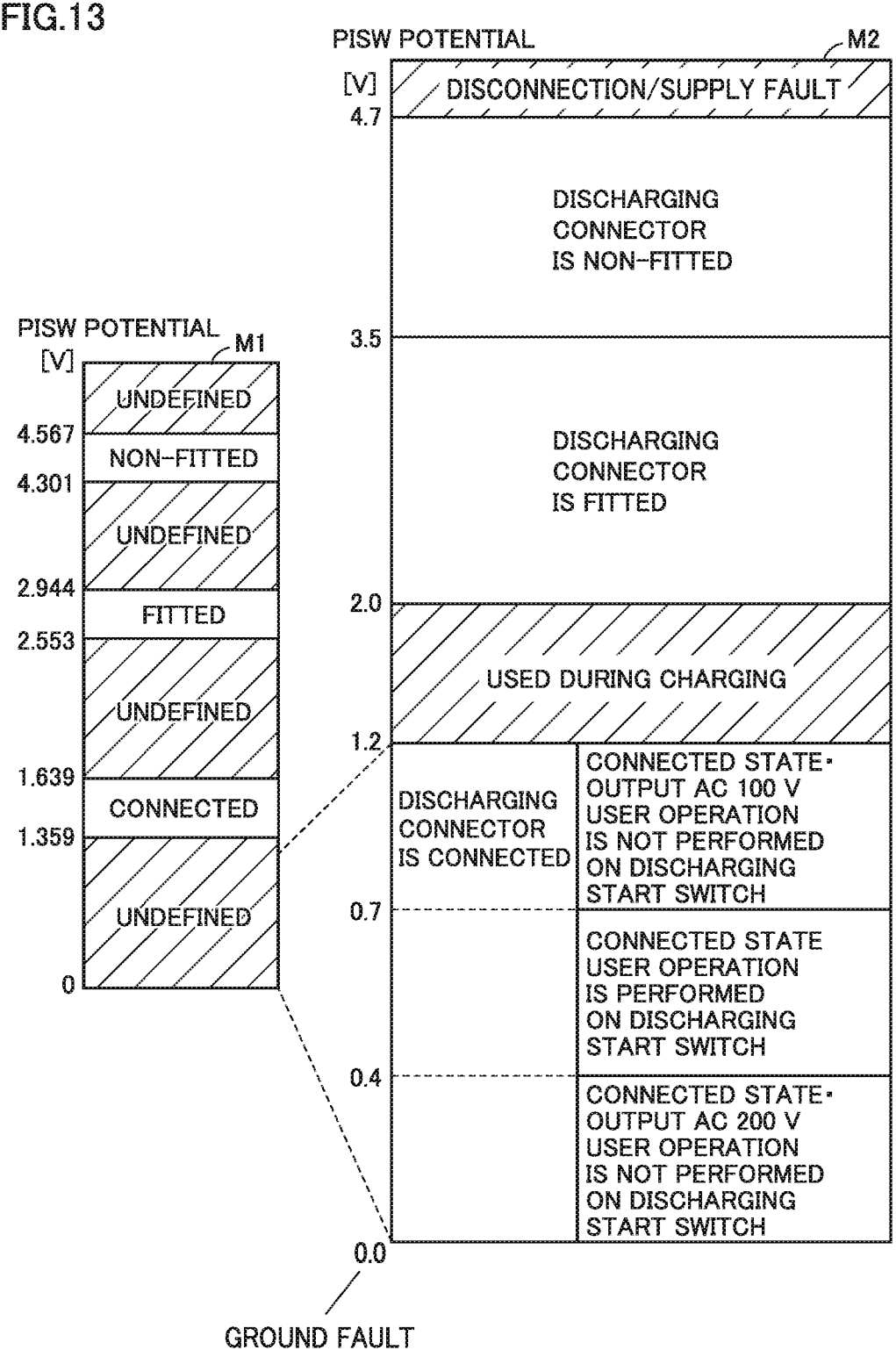
FIG. 13 is a diagram for illustrating a PISW signal (potential signal).

FIG. 13 is a diagram for illustrating the PISW signal (PISW potential). Referring to FIG. 13, a potential map M1 about the PISW potential indicates a determination value for each potential range defined in the charging standard "IEC61851-1". In the range of 0 to 4.7 V, the connector states such as the connected state, the fitted state and the non-fitted state are defined as the determination values for the potential range of 1.359 to 1.639 V, the potential range of 2.553 to 2.944 V, and the potential range of 4.301 to 4.567 V, respectively. The potential ranges other than these are undefined.

Potential map M2 about the PISW potential is a control map used for control, and is stored in storage device 253 of ECU 250 shown in FIG. 2. In potential map M2, the connector state, the switch state and the requested voltage value of the discharging connector are set for each potential range. When the discharging connector is electrically connected to inlet 210, ECU 250 can use potential map M2 to obtain the connector state, the switch state and the requested voltage value of the discharging connector based on the PISW signal. ECU 250 can also determine whether the discharging connector is electrically connected to inlet 210, based on the PISW signal.

Furthermore, ECU 250 obtains the type of the electrical outlet of the discharging assembly connected to inlet 210, based on the PISW signal. In the present embodiment, the requested voltage value of the discharging assembly (discharging connector) corresponds to the type of the electrical outlet of the discharging assembly. Specifically, the requested voltage value of the discharging connector connected to inlet 210 being 200 V means that the discharging connector connected to inlet 210 is the 200V connector shown in FIGS. 5 to 9, i.e., that the discharging connector connected to inlet 210 includes one first electrical outlet, one second electrical outlet and one third electrical outlet. The requested voltage value of the discharging connector connected to inlet 210 being 100 V means that the discharging connector connected to inlet 210 is the 100V connector shown in FIGS. 10 to 12, i.e., that the discharging connector connected to inlet 210 includes only one first electrical outlet. Therefore, in potential map M2, the type of the electrical outlet is not set, although the requested voltage value is set. However, the present disclosure is not limited to the foregoing. In the configuration in which the requested voltage value and the type of the electrical outlet do not necessarily have a correspondence relationship, potential map M2 (control map) may be changed so as to set the type of the electrical outlet of the discharging assembly, in addition to the requested voltage value of the discharging assembly.

In potential map M2, a potential range indicating that the discharging connector is in the connected state (hereinafter, also referred to as "connected range") is assigned to the potential range of 0.0 to 1.2 V. A potential range used during charging (charging range) is assigned to the potential range of 1.2 to 2.0 V. A potential range indicating that the discharging connector is in the fitted state (hereinafter, also referred to as "fitted range") is assigned to the potential range of 2.0 to 3.5 V. A potential range indicating that the discharging connector is in the non-fitted state (hereinafter, also referred to as "non-fitted range") is assigned to the potential range of 3.5 to 4.7 V.

In potential map M2, the connected range is assigned to the potential range of 0.0 to 1.2 V that is not defined in the charging standard "IEC61851-1". Thus, it is easier for ECU 250 to distinguish between the charging connector and the discharging connector. The connected range is further divided into three potential ranges (0.0 to 0.4 V/0.4 to 0.7 V/0.7 to 1.2 V) described below.

A potential range indicating that the requested voltage value of the discharging connector connected to inlet 210 is 200 V (hereinafter, also referred to as "200V range") is assigned to the potential range of 0.0 to 0.4 V. The PISW potential belonging to the 200V range means that the discharging connector connected to inlet 210 is a 200V connector. A potential range indicating that the requested voltage value of the discharging connector connected to inlet 210 is 100 V (hereinafter, also referred to as "100V range") is assigned to the potential range of 0.7 to 1.2 V. The PISW potential belonging to the 100V range means that the discharging connector connected to inlet 210 is a 100V connector. Since the 100V connector (FIG. 11) and the 200V connector (FIG. 7) are different in resistance value, the 100V connector (FIG. 11) and the 200V connector (FIG. 7) are also different in PISW potential when each connector is connected to inlet 210. Each of the 100V range and the 200V range also indicates that the discharging start switch of the discharging connector is OFF, in addition to the requested voltage value of the discharging connector connected to inlet 210.

A potential range indicating that the discharging start switch is ON (hereinafter, also referred to as "discharging start range") is assigned to the potential range of 0.4 to 0.7 V. Since switch S2 (FIG. 7) that works in conjunction with discharging start switch 112 is a normally-on switch in the 200V connector, the PISW potential rises when discharging start switch 112 is switched from the OFF state to the ON state. Since switch S2A (FIG. 11) that works in conjunction with discharging start switch 112A is a normally-off switch in the 100V connector, the PISW potential falls when discharging start switch 112A is switched from the OFF state to the ON state.

Figure 14:
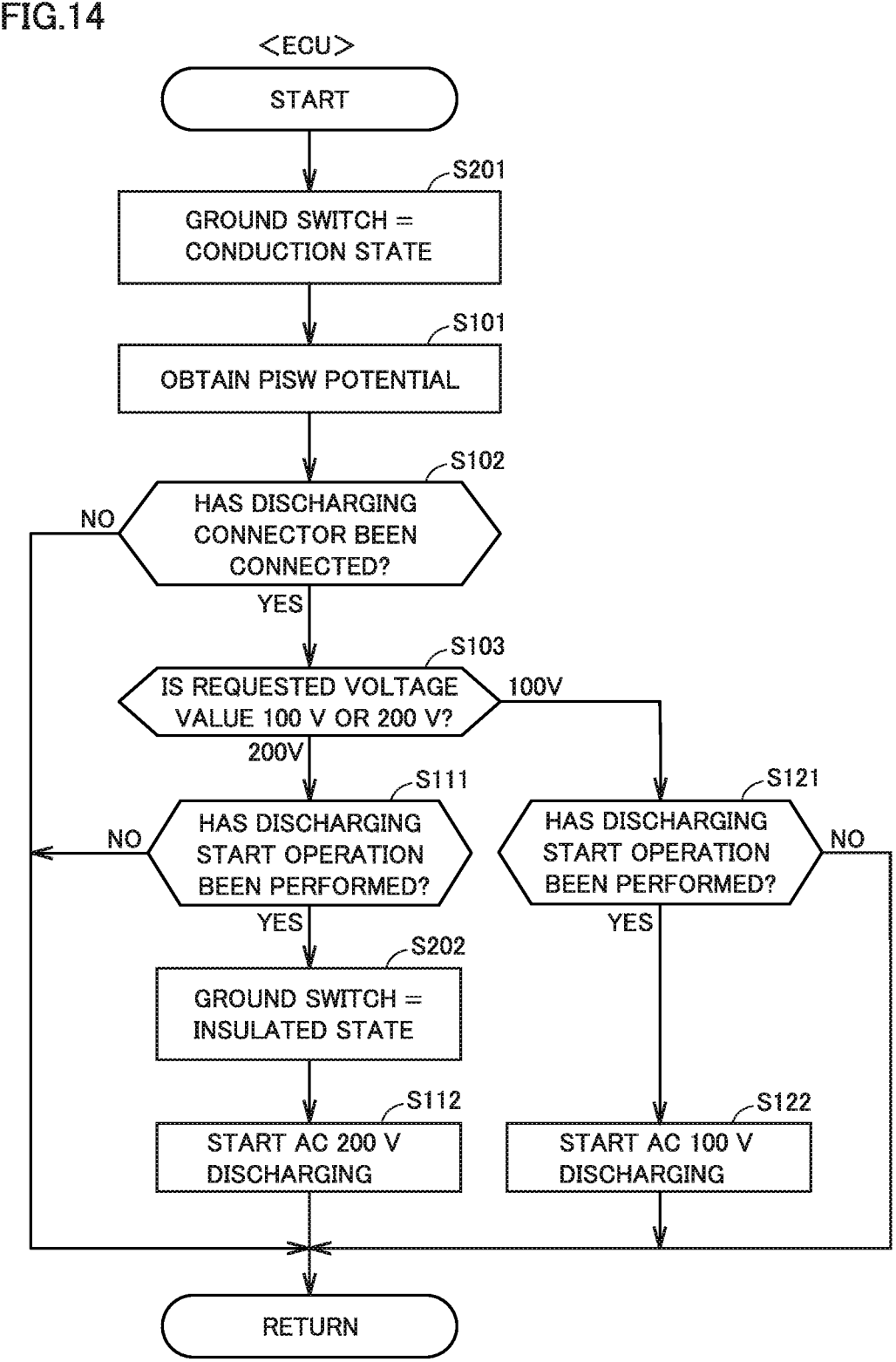
FIG. 14 is a flowchart showing a power feeding method according to the embodiment of the present disclosure.

FIG. 14 is a flowchart showing a process related to the start of discharging performed by ECU 250. The process shown in this flowchart is repeatedly performed during a halt of vehicle 200 (excluding during charging and during discharging).

Referring to FIG. 14 together with FIGS. 1 to 13, in S201, ECU 250 brings switch S20 into the closed state (conduction state). Next, in S101, ECU 250 obtains the PISW signal (PISW potential). Next, in S102, ECU 250 determines whether the discharging connector has been connected to inlet 210, based on the PISW signal. When the connector state enters the connected state, determination of YES is made in S102 and the process proceeds to S103. In S103, ECU 250 determines whether the requested voltage value of the discharging connector connected to inlet 210 is 100 V or 200 V.

ECU 250 uses potential map M2 shown in FIG. 13 to obtain the state (e.g., connector state) of inlet 210 and the information (e.g., switch state, requested voltage value and type of electrical outlet) about the discharging connector connected to inlet 210, based on the PISW signal obtained in S101. ECU 250 can determine the connector state (non-fitted state/fitted state/connected state), based on whether the PISW potential belongs to the non-fitted range, the fitted range or the connected range. ECU 250 can also determine whether the discharging start switch has been operated by the user, based on whether the PISW potential belongs to the discharging start range. Furthermore, ECU 250 can determine the requested voltage value (100 V/200 V) of the discharging connector, based on whether the PISW potential belongs to the 100V range or the 200V range. In addition, ECU 250 determines that the discharging connector connected to inlet 210 does not include a one-terminal-type electrical outlet, when the PISW potential belongs to the 100 V range, and determines that the discharging connector connected to inlet 210 includes a one-terminal-type electrical outlet, when the PISW potential belongs to the 200 V range. As described above, ECU 250 is configured to obtain the requested voltage value of the discharging connector connected to inlet 210 and the type of the electrical outlet of the discharging connector connected to inlet 210, based on the potential signal from PISW (detection terminal) of inlet 210, when switch S20 is in the conduction state. When switch S20 is in the conduction state, GND of inlet 210 has the same potential as that of the body of vehicle 200. Therefore, the PISW signal becomes stable, and thus, potential map M2 and the PISW signal are likely to correspond to each other.

When it is determined in S103 that the requested voltage value of the discharging connector connected to inlet 210 is 200 V, the process proceeds to S111. The determination in S103 that the requested voltage value of the discharging connector connected to inlet 210 is 200 V means that the discharging connector connected to inlet 210 includes at least one of the second electrical outlet and the third electrical outlet. In S111, ECU 250 determines whether the AC 200 V discharging start operation (discharging start switch operation in the order of ON, OFF, ON, and OFF shown in FIG. 9) has been performed by the user. When the AC 200 V discharging start operation has been performed by the user (YES in S111), ECU 250 brings switch S20 (see FIGS. 7 and 8) into the open state (insulated state) in S202. Next, ECU 250 outputs the single-phase AC power of 200 V from inlet 210 to the 200V connector side in S112. Specifically, ECU 250 controls AC inverters 221A and 221B such that the single-phase AC power of 200 V is output between AC1 and AC2 of inlet 210 shown in FIG. 8. In the present embodiment, AC inverter 221A applies an AC voltage (AC 100 V) corresponding to a half of the requested voltage value between AC1 and GND, and AC inverter 221B applies an AC voltage (AC 100 V) corresponding to a half of the requested voltage value between AC2 and GND. Thus, the single-phase AC power of 200 V, 100 V and 100 V are output to electrical outlet To1, electrical outlet To2 and electrical outlet To3 of the 200V connector, respectively. As described above, when vehicle 200 starts feeding of the AC power through the 200V connector, ECU 250 maintains switch S20 in the open state even during discharging. Then, when discharging ends, ECU 250 returns switch S20 to the closed state.

When it is determined in S103 that the requested voltage value of the discharging connector connected to inlet 210 is 100 V, the process proceeds to S121. The determination in S103 that the requested voltage value of the discharging connector connected to inlet 210 is 100 V means that the discharging connector connected to inlet 210 does not include the second electrical outlet and the third electrical outlet. In S121, ECU 250 determines whether the AC 100 V discharging start operation (discharging start switch operation in the order of ON, OFF, ON, and OFF shown in FIG. 12) has been performed by the user. When the AC 100 V discharging start operation has been performed by the user (YES in S121), ECU 250 outputs the single-phase AC power of 100 V from inlet 210 to the 100V connector side in S122. Specifically, ECU 250 controls AC inverters 221A and 221B such that the single-phase AC power of 100 V is output between AC1 and AC2 of inlet 210 shown in FIG. 10. In the present embodiment, each of AC inverters 221A and 221B applies an AC voltage (AC 50 V) corresponding to a half of the requested voltage value, thereby applying AC 100 V between AC1 and AC2. Thus, the single-phase AC power of 100 V is output to electrical outlet To4 of the 100V connector. However, the present disclosure is not limited to the foregoing. ECU 250 may cause only AC inverter 221A to apply AC 100 V between AC1 and AC2, and bring AC inverter 221B into a voltage non-application state (conduction state). As described above, when vehicle 200 performs feeding of the AC power through the 100V connector, discharging is started, with switch S20 (see FIGS. 10 and 11) remaining in the closed state. ECU 250 maintains switch S20 in the closed state even during discharging.

When discharging is started in S112 or S122 described above, a series of process shown in FIG. 14 ends. The started discharging ends when a prescribed discharging end condition is satisfied. When the prescribed discharging stop condition is satisfied, ECU 250 controls AC inverters 221A and 221B so as to stop the discharging from inlet 210 to the discharging connector. As described above, the above-described discharging stop condition is satisfied when the connector state enters the fitted state or the non-fitted state during discharging. The above-described discharging stop condition is also satisfied when the SOC of battery 230 becomes equal to or smaller than a prescribed SOC value. However, the present disclosure is not limited to the foregoing. The discharging stop condition can be arbitrarily set.

As described above, a power feeding method according to the present embodiment includes: determining whether the discharging assembly (discharging connector) connected to inlet 210 of vehicle 200 includes at least one of the second electrical outlet and the third electrical outlet (S103); electrically disconnecting GND of inlet 210 from the body of vehicle 200 (S202) when it is determined that the discharging assembly connected to inlet 210 includes at least one of the second electrical outlet and the third electrical outlet ("200 V" in S103); and applying, after electrically disconnecting GND of inlet 210 from the body of vehicle 200 (S202), the AC voltages between AC1 and GND of inlet 210 and between AC2 and GND of inlet 210 (S112).

According to the above-described power feeding method, it is possible to reduce noise included in the supplied power when vehicle 200 performs feeding of the AC power through the discharging assembly (including the discharging connector). The AC power from vehicle 200 is output from the AC power supply of non-grounded wiring type (floating type) insulated from battery 230.

In the process shown in FIG. 14, when the discharging connector connected to inlet 210 does not include the second electrical outlet and the third electrical outlet ("100 V" in S103), switch S20 is not driven. Thus, deterioration of switch S20 is suppressed. However, the present disclosure is not limited to the foregoing. For example, in the configuration in which the 100V connector includes the second or third electrical outlet instead of the first electrical outlet, ECU 250 may also bring switch S20 into the open state (insulated state) and then start discharging when it is determined in S103 that the requested voltage value of the discharging connector connected to inlet 210 is 100 V, similarly to when it is determined in S103 that the requested voltage value of the discharging connector connected to inlet 210 is 200 V.

The control map used to distinguish the discharging connector is not limited to potential map M2 shown in FIG. 13. For example, ECU 250 may detect the requested voltage value of the discharging connector by using a potential range other than the potential range of 0.0 to 1.2 V. More specifically, the connected range including the 100V range, the 200V range and the discharging start range may be assigned to any one of the potential range of 1.639 to 2.553 V, the potential range of 2.944 to 4.301 V and the potential range of 4.567 to 4.700 V, which are not defined in the charging standard "IEC61851-1".

Although the above-described embodiment provides the example of outputting AC 100 V/AC 200 V by the single-phase three-line-type wiring, the voltage output by the single-phase three-line-type wiring can be changed as appropriate. For example, AC 110 V/AC 220 V, AC 115 V/AC 230 V or AC 120 V/AC 240 V may be output by the single-phase three-line-type wiring.

The configuration of the 200V connector is not limited to the configuration shown in FIGS. 5 to 9. For example, any one or two of electrical outlets To1 to To3 may be omitted. However, the 200V connector that does not include both electrical outlets To2 and To3 no longer corresponds to the discharging connector including at least one of the second electrical outlet and the third electrical outlet. In addition, cover 120 may be omitted. Furthermore, discharging start switch 112 can also be omitted. A trigger to start discharging can be arbitrarily set. For example, discharging may be started when a prescribed time period has elapsed since the connector state entered the connected state. Alternatively, discharging may be started when the user operates a switch provided in the vehicle.

Figure 15:
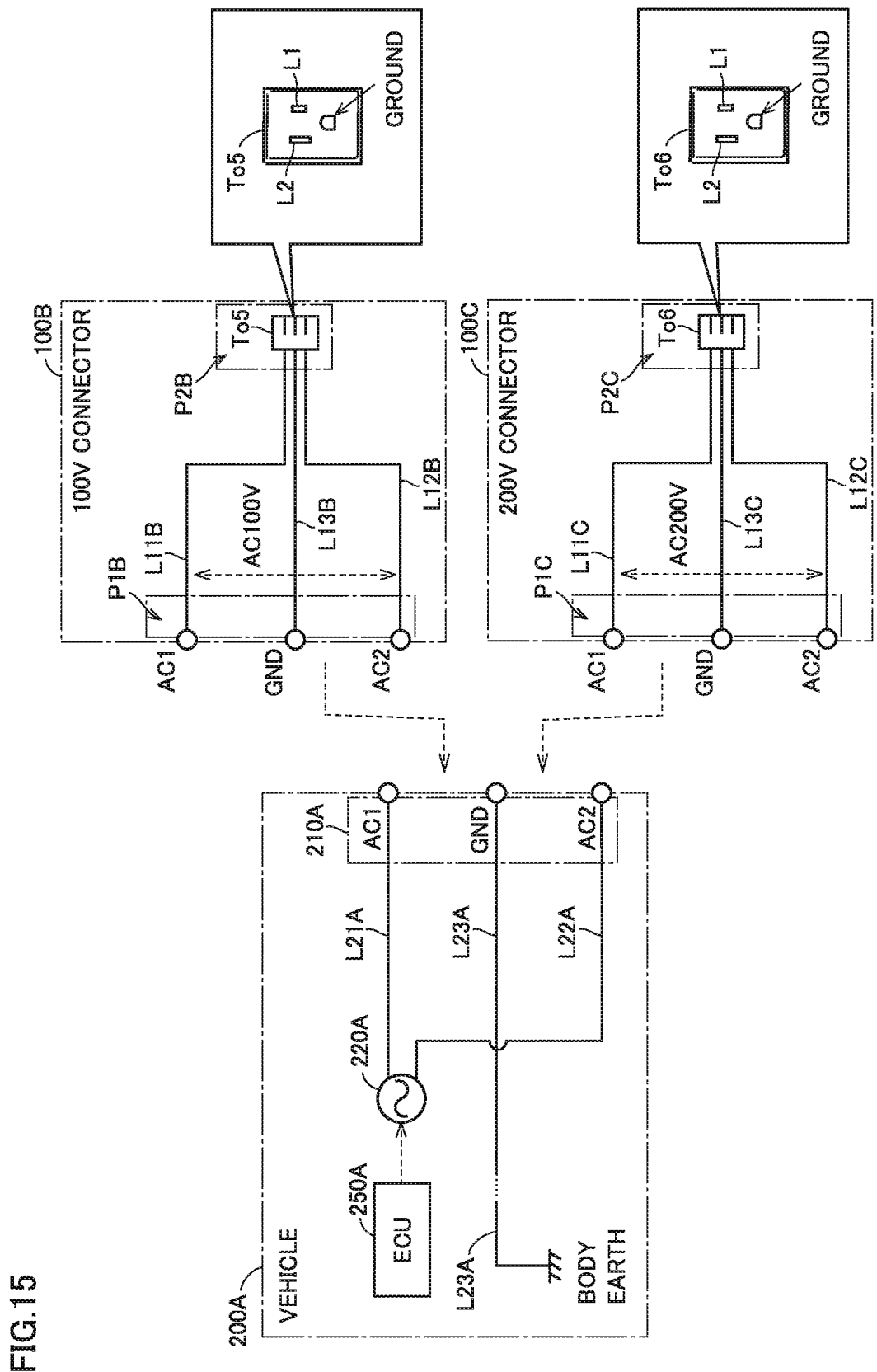
FIG. 15 shows a configuration of a vehicle according to a modification.

In some embodiments, the ground switch may not be arranged between the ground terminal (GND) of inlet 210 and the vehicle body in the vehicle. The ground switch may be omitted and the ground terminal of inlet 210 may be constantly grounded to the vehicle body. FIG. 15 shows a configuration of a vehicle 200A according to a modification.

Referring to FIG. 15, vehicle 200A according to the modification includes an inlet 210A, an AC power supply 220A and an ECU 250A. AC power supply 220A is configured to apply an AC voltage between AC1 and AC2 of inlet 210A. AC power supply 220A is electrically connected to AC1 and AC2 of inlet 210A through voltage lines L21A and L22A. AC power supply 220A includes a vehicle-mounted battery (e.g., battery 230 shown in FIG. 2) and a power conversion circuit. The power conversion circuit of AC power supply 220A may be a vehicle-mounted charger (e.g., charger 222 shown in FIG. 4) configured to allow bidirectional power conversion, or may be a vehicle-mounted inverter (e.g., AC inverter 221 shown in FIG. 3).

In vehicle 200A according to the modification, GND of inlet 210A is grounded to a body of vehicle 200A through a ground line L23A (body earth). Inlet 210A is configured to be connectable to a discharging connector 100B and a discharging connector 100C. A requested voltage value (first voltage) of discharging connector 100B is 100 V, and a requested voltage value (second voltage) of a discharging connector 100C is 200 V. Namely, discharging connectors 100B and 100C correspond to a 100V connector and a 200V connector, respectively. Each of discharging connectors 100B and 100C functions as a discharging assembly. Discharging connectors 100B and 100C correspond to examples of "second discharging connector (second discharging assembly)" and "third discharging connector (third discharging assembly)" according to the present disclosure, respectively.

Figure 16:
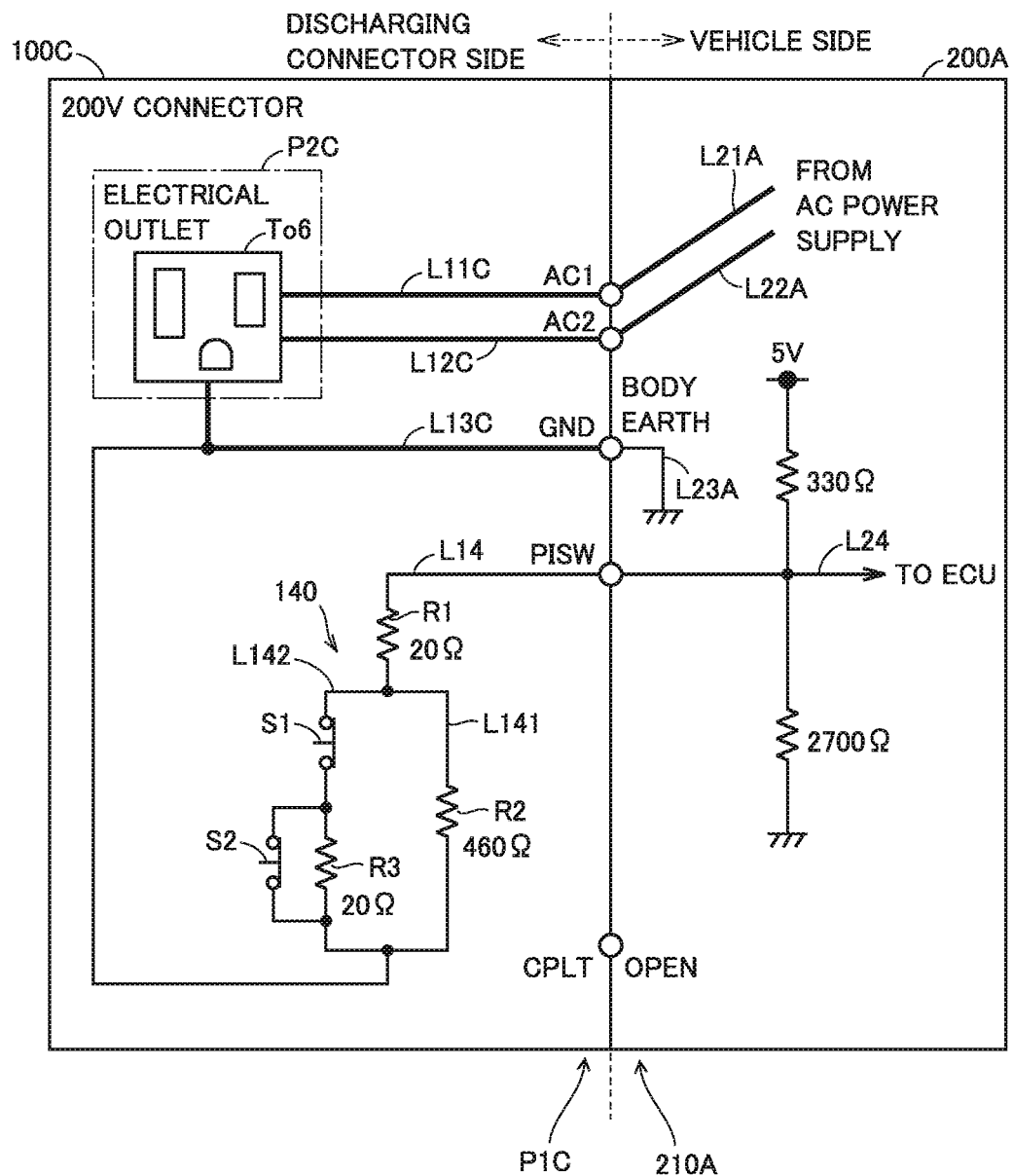
FIG. 16 shows a schematic circuit configuration of a discharging connector and a vehicle inlet according to the modification.

Although FIG. 15 shows only AC1, AC2 and GND, inlet 210A also includes PISW and CPLT, similarly to inlet 210 shown in FIG. 7. In addition, each of discharging connectors 100B and 100C includes terminals corresponding to the above-described terminals (AC1, AC2, GND, PISW, and CPLT) of inlet 210. FIG. 16 shows a schematic circuit configuration of discharging connector 100C and inlet 210A.

Referring to FIG. 16, the circuit configuration of discharging connector 100C is similar to the circuit configuration of discharging connector 100 shown in FIG. 7. In a state where discharging connector 100C is connected to inlet 210A, a closed circuit is formed such that PISW and GND are connected to each other with a circuit of discharging connector 100C (including detection circuit 140) interposed therebetween. A potential of PISW (detection terminal) changes in accordance with the requested voltage value of the discharging connector connected to inlet 210A. A potential signal of PISW is input to ECU 250A (FIG. 15) of vehicle 200A. Ground line L23A that connects GND of inlet 210A and the body of vehicle 200A to each other is not provided with a switch, and GND of inlet 210A constantly has the same potential as that of the body of vehicle 200A. PISW is configured to determine a state (connector state) of inlet 210A. ECU 250A (FIG. 15) is configured to use potential map M2 shown in FIG. 13 to obtain the connector state, the requested voltage value and the type of the electrical outlet about the discharging connector connected to inlet 210A, based on the PISW signal (PISW potential).

Since a circuit configuration of discharging connector 100B is the same as the circuit configuration of discharging connector 100A shown in FIG. 11, the circuit configuration of discharging connector 100B is not shown. In addition, a hardware configuration of ECU 250A is the same as the configuration of ECU 250 shown in FIG. 2.

Referring to FIG. 15 together with FIG. 16, discharging connector 100B includes a first end P1B connectable to inlet 210A, and a second end P2B including an electrical outlet To5. Electrical outlet To5 outputs an AC voltage to be applied between AC1 and AC2 of inlet 210A. As to discharging connector 100B, electrical outlet terminals electrically connected to a voltage line L11B and a voltage line L12B are denoted as "L1" and "L2", respectively. As shown in FIG. 15, electrical outlet To5 includes L1, L2 and a ground terminal. Electrical outlet To5 outputs single-phase AC power of 100 V between L1 and L2. Electrical outlet To5 corresponds to the first electrical outlet. Discharging connector 100B includes only a two-terminal-type electrical outlet and does not include a one-terminal-type electrical outlet.

In discharging connector 100B, first end P1B and electrical outlet To5 are connected to each other by voltage line L11B, voltage line L12B and a ground line L13B. Voltage line L11B and voltage line L12B are connected to AC1 and AC2 at first end P1B, respectively. Ground line L13B is connected to GND at first end P1B. In the present modification, ECU 250A recognizes that discharging connector 100B has been connected to inlet 210A, based on the PISW signal, and controls the power conversion circuit of AC power supply 220A such that an AC voltage of 100 V is applied between AC1 and AC2 of inlet 210A.

Discharging connector 100C includes a first end P1C connectable to inlet 210A, and a second end P2C including an electrical outlet To6. Electrical outlet To6 outputs an AC voltage to be applied between AC1 and AC2 of inlet 210A. As to discharging connector 100C, electrical outlet terminals electrically connected to voltage line L11C and voltage line L12C are denoted as "L1" and "L2", respectively. As shown in FIG. 15, electrical outlet To6 includes L1, L2 and a ground terminal. Electrical outlet To6 outputs single-phase AC power of 200 V between L1 and L2. Electrical outlet To6 corresponds to the first electrical outlet. Discharging connector 100C includes only a two-terminal-type electrical outlet and does not include a one-terminal-type electrical outlet.

In discharging connector 100C, first end P1C and electrical outlet To6 are connected to each other by voltage line L11C, voltage line L12C and a ground line L13C. Voltage line L11C and voltage line L12C are connected to AC1 and AC2 at first end P1C, respectively. Ground line L13C is connected to GND at first end P1B. In the present modification, ECU 250A recognizes that discharging connector 100C has been connected to inlet 210A, based on the PISW signal, and controls the power conversion circuit of AC power supply 220A such that an AC voltage of 200 V is applied between AC1 and AC2 of inlet 210A.

Figure 17:
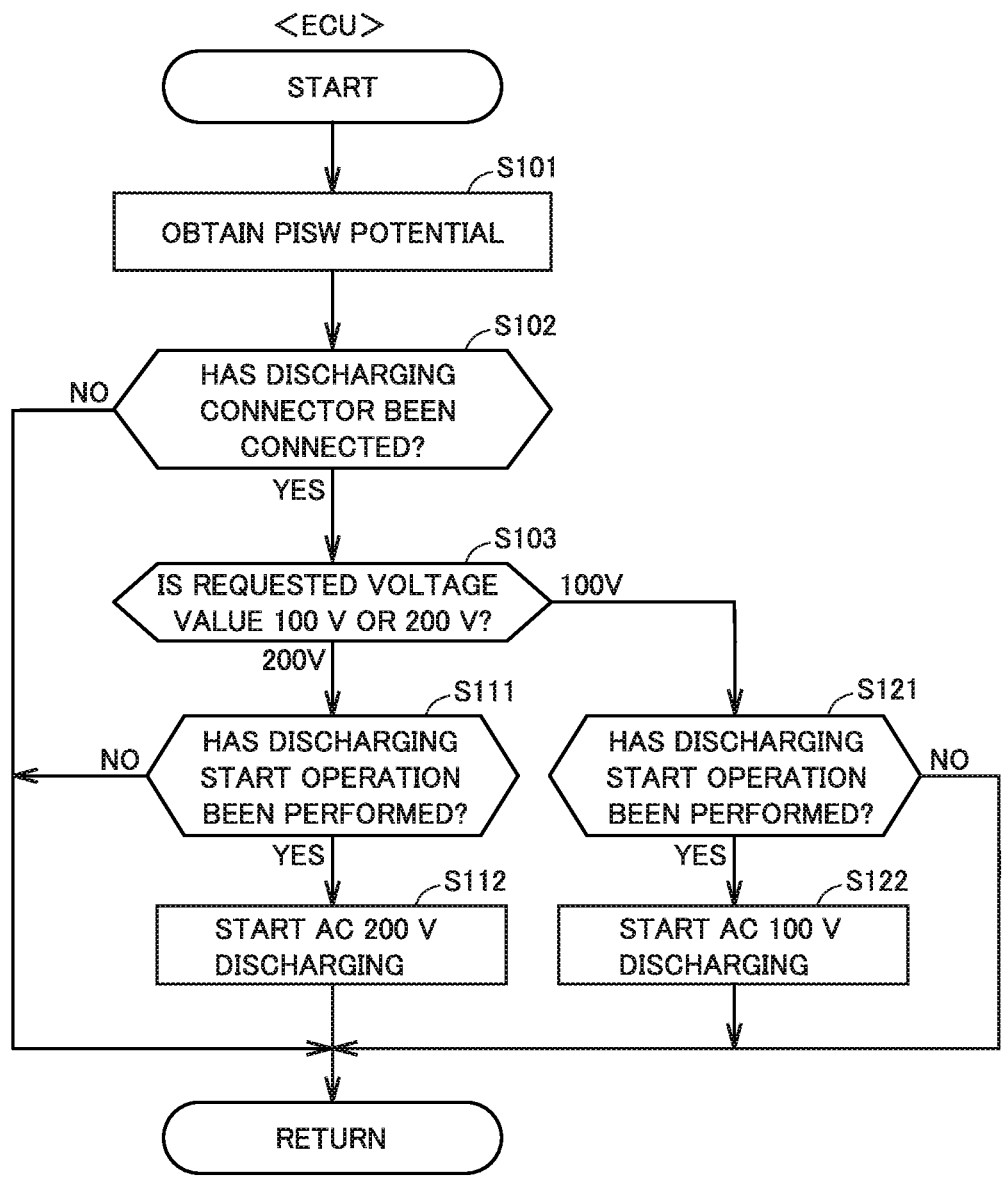
FIG. 17 is a flowchart showing a modification of the process shown in FIG. 14.

ECU 250A performs a below-described process shown in FIG. 17, instead of the process shown in FIG. 14. FIG. 17 is a flowchart showing a modification of the process shown in FIG. 14. The process shown in FIG. 17 is the same as the process shown in FIG. 14, except that S201 and S202 (FIG. 14) are omitted.

Referring to FIG. 17 together with FIGS. 15 and 16, when discharging connector 100B is connected to inlet 210A ("100 V" in S103), ECU 250A controls the power conversion circuit of AC power supply 220A such that an AC voltage corresponding to 100 V (first voltage) is applied between AC1 and AC2 of inlet 210A in S121. When discharging connector 100C is connected to inlet 210A ("200 V" in S103), ECU 250A controls the power conversion circuit of AC power supply 220A such that an AC voltage corresponding to 200 V (second voltage) is applied between AC1 and AC2 of inlet 210A. As a result of the above-described control, the AC power suitable for the discharging connector connected to inlet 210A is supplied to each discharging connector.

In the above-described modification, the first voltage is 100 V, and the second voltage is 200 V. However, the present disclosure is not limited to the foregoing. The first voltage and the second voltage can be changed as appropriate. The second voltage may be any voltage as long as the second voltage is higher than the first voltage. For example, the first voltage/the second voltage may be 95 V/190 V, 110 V/220 V, 115 V/230 V, 120 V/240 V, 130 V/260 V, or 150 V/300 V.

Figure 18:
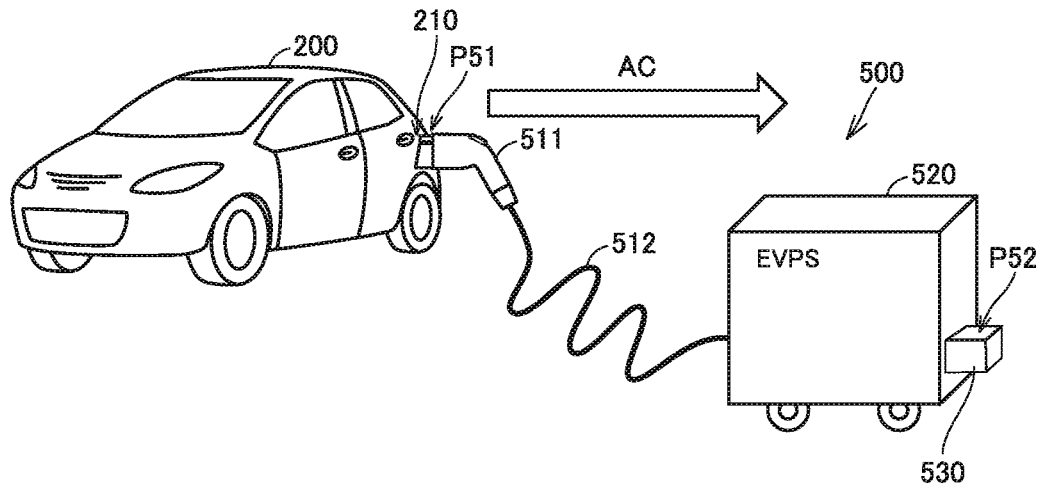
FIG. 18 shows a modification of a discharging assembly (discharging connector) shown in FIGS. 5 and 6.

In the above-described embodiment and modification, the discharging connector (e.g., discharging connector 100, 100A, 100B, or 100C) alone functions as a discharging assembly. In some embodiments, the discharging connector alone does not form the discharging assembly. FIG. 18 shows a modification of the discharging assembly (discharging connector) shown in FIGS. 5 and 6.

Referring to FIG. 18, a discharging assembly 500 includes a discharging connector 511, a housing 520 into which a circuit electrically connected to discharging connector 511 is built, and a cable 512 that connects discharging connector 511 and housing 520 to each other. Housing 520 corresponds to a main body portion of an electric vehicle power system (EVPS). The EVPS is configured to control charging and discharging of a vehicle. Housing 520 may include a display. Discharging assembly 500 includes the EVPS and a charging and discharging cable assembly. The charging and discharging cable assembly is a cable assembly that couples the vehicle to the EVPS, and includes a charging and discharging connector coupled to the vehicle. In the example shown in FIG. 18, discharging connector 511 functions as a charging and discharging connector. Cable 512 functions as a charging and discharging cable.

Figure 19:
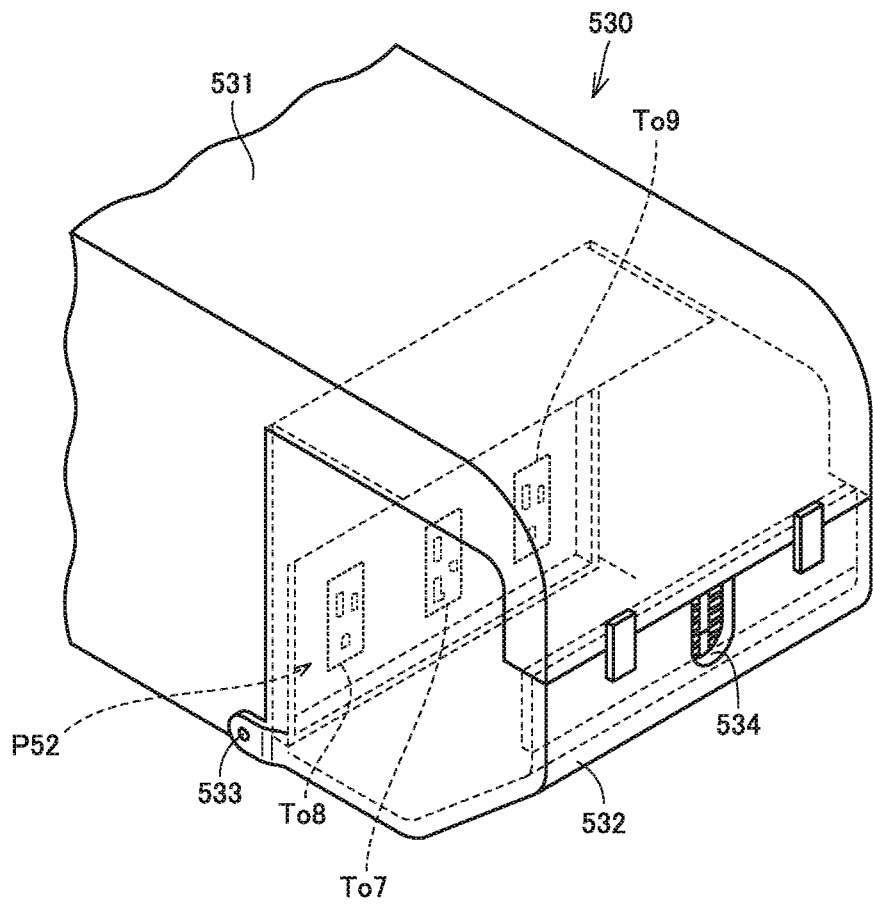
FIG. 19 shows an internal structure of an electrical outlet box shown in FIG. 18.

Discharging connector 511 includes a first end P51 of discharging assembly 500 configured to be connectable to inlet 210 of vehicle 200. Housing 520 includes an electrical outlet box 530. Electrical outlet box 530 includes a second end P52 of discharging assembly 500. In the present modification, the circuit (circuit of discharging connector 100) shown in FIGS. 7 and 8 is provided within discharging connector 511, cable 512 and housing 520. FIG. 19 shows an internal structure of electrical outlet box 530.

Referring to FIG. 19, electrical outlet box 530 includes a cover 532 that covers second end P52 in the closed state and exposes second end P52 in the open state. Second end P52 includes an electrical outlet To7 (first electrical outlet), an electrical outlet To8 (second electrical outlet) and an electrical outlet To9 (third electrical outlet). Electrical outlets To7, To8 and To9 have terminal structures similar to those of electrical outlets To1, To2 and To3 shown in FIG. 8, respectively. However, electrical outlet To8 and electrical outlet To9 are arranged at distant locations. Cover 532 is attached to a main body portion 531 of electrical outlet box 530 through a rotating mechanism 533 (e.g., hinge). Cover 532 is provided with a hole 534 through which a cord (e.g., power cord 320 shown in FIG. 1) is inserted.

In discharging assembly 500 according to the modification shown in FIGS. 18 and 19 above, discharging connector 511 and housing 520 are connected to each other through cable 512, and thus, it is easier to arrange first end P51 and second end P52 at distant locations. Therefore, a degree of freedom of arrangement of the electrical outlets is higher. In addition, since a part of the discharging circuit can be housed in housing 520, it is easier to achieve a reduction in size of discharging connector 511.

In the above-described embodiment, the discharging connectors of two types of voltages (100 V/200 V) are connectable to the inlet of the vehicle. However, discharging connectors of three or more types of voltages may be connectable to the inlet of the vehicle. In addition, in the above-described embodiment, the AC power is output from the vehicle inlet to the discharging connector. However, the present disclosure is not limited to the foregoing. DC power may be supplied from the vehicle inlet to the discharging connector and DC/AC conversion may be performed in the discharging connector. In the embodiment and each modification described above, the vehicle is not limited to the BEV, and may be another xEV (e.g., PHEV or FCEV).

The above-described modifications may be implemented in any combination. For example, the circuit shown in FIG. 16 (circuit of discharging connector 100C) may be provided within discharging connector 511, cable 512 and housing 520 shown in FIG. 18.

Although the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle comprising a power storage device, a discharging port, a power conversion circuit, and a controller, wherein
   the power conversion circuit is configured to receive DC power supplied from the power storage device and output the DC power to the discharging port side,
   the discharging port includes a first output terminal, a second output terminal and a ground terminal,
   each of the first output terminal and the second output terminal is not grounded to a body of the vehicle,
   the controller is configured to obtain a requested voltage value of a discharging connector connected to the discharging port,
   when the discharging connector is connected to the discharging port, the controller controls the power conversion circuit such that a voltage corresponding to the requested voltage value of the discharging connector is applied between the first output terminal and the second output terminal,
   the vehicle further includes a switch that switches a conduction state and an insulated state between the ground terminal and the body of the vehicle,
   the discharging port includes a detection terminal that outputs, to the controller, a potential signal indicating information about a discharging assembly including the discharging connector connected to the discharging port,
   in a state where the discharging connector is connected to the discharging port, a closed circuit is formed such that the detection terminal and the ground terminal are connected to each other with the discharging connector interposed therebetween, the controller is configured to, when the switch is in the conduction state, obtain the requested voltage value of the discharging connector of the discharging assembly and a type of an electrical outlet of the discharging assembly, based on the potential signal from the detection terminal, and the type of the electrical outlet includes a first electrical outlet that outputs an AC voltage to be applied between the first output terminal and the second output terminal, a second electrical outlet that outputs an AC voltage to be applied between the first output terminal and the ground terminal, and a third electrical outlet that outputs an AC voltage to be applied between the second output terminal and the ground terminal.

2. The vehicle according to claim 1, wherein
the power conversion circuit includes a first power conversion circuit and a second power conversion circuit,
the first power conversion circuit is configured to apply an AC voltage between the first output terminal and the ground terminal,
the second power conversion circuit is configured to apply an AC voltage between the second output terminal and the ground terminal,
when the discharging connector of the discharging assembly including at least one of the second electrical outlet and the third electrical outlet is connected to the discharging port, the controller brings the switch into the insulated state, and
after the controller brings the switch into the insulated state, the controller controls the first power conversion circuit and the second power conversion circuit such that an AC voltage corresponding to the requested voltage value of the discharging connector is applied between the first output terminal and the second output terminal.

3. The vehicle according to claim 2, wherein
the discharging port is configured to be connectable to a first discharging connector of a first discharging assembly,
the first discharging connector includes a first input terminal connected to a first voltage line, a second input terminal connected to a second voltage line, and a ground terminal connected to a neutral line,
when the first discharging connector and the discharging port are connected to each other, the first input terminal, the second input terminal and the ground terminal of the first discharging connector come into contact with the first output terminal, the second output terminal and the ground terminal of the discharging port, respectively,
the first discharging assembly includes
an electrical outlet corresponding to the first electrical outlet, the first electrical outlet including a first voltage terminal connected to the first voltage line, a second voltage terminal connected to the second voltage line, and a ground terminal connected to the neutral line,
an electrical outlet corresponding to the second electrical outlet, the second electrical outlet including a voltage terminal connected to the first voltage line, and a ground terminal connected to the neutral line, and
an electrical outlet corresponding to the third electrical outlet, the third electrical outlet including a voltage terminal connected to the second voltage line, and a ground terminal connected to the neutral line, when the first discharging connector of the first discharging assembly is connected to the discharging port, the controller brings the switch into the insulated state, and after the controller brings the switch into the insulated state, the controller controls the first power conversion circuit such that an AC voltage corresponding to a half of the requested voltage value of the first discharging connector is applied between the first output terminal and the ground terminal, and controls the second power conversion circuit such that an AC voltage corresponding to a half of the requested voltage value of the first discharging connector is applied between the second output terminal and the ground terminal.

4. A vehicle comprising a power storage device, a discharging port, a power conversion circuit, and a controller, wherein the power conversion circuit is configured to receive DC power supplied from the power storage device and output the DC power to the discharging port side, the discharging port includes a first output terminal, a second output terminal and a ground terminal, each of the first output terminal and the second output terminal is not grounded to a body of the vehicle, the controller is configured to obtain a requested voltage value of a discharging connector connected to the discharging port, when the discharging connector is connected to the discharging port, the controller controls the power conversion circuit such that a voltage corresponding to the requested voltage value of the discharging connector is applied between the first output terminal and the second output terminal, the ground terminal of the discharging port is grounded to the body of the vehicle, the discharging port is configured to be connectable to each of a second discharging connector of a second discharging assembly and a third discharging connector of a third discharging assembly, each of the second discharging assembly and the third discharging assembly includes an electrical outlet that outputs a voltage to be applied between the first output terminal and the second output terminal, a requested voltage value of the second discharging connector is a first voltage, a requested voltage value of the third discharging connector is a second voltage higher than the first voltage, the discharging port includes a detection terminal whose potential changes in accordance with the requested voltage value of the discharging connector connected to the discharging port, and a potential signal of the detection terminal is input to the controller the controller when the second discharging connector of the second discharging assembly is connected to the discharging port, controls the power conversion circuit such that a voltage corresponding to the first voltage is applied between the first output terminal and the second output terminal, and when the third discharging connector of the third discharging assembly is connected to the discharging port, controls the power conversion circuit such that a voltage corresponding to the second voltage is applied between the first output terminal and the second output terminal.

5. The vehicle according to claim 4, wherein
the first voltage is equal to or higher than 95 V and equal to or lower than 150 V, and
the second voltage is equal to or higher than 190 V and equal to or lower than 300 V.

6. The vehicle according to claim 4, wherein
the detection terminal is configured to determine a state of the discharging port,
the state determined by the detection terminal includes a non-fitted state, a fitted state and a connected state,
the non-fitted state is a state in which the discharging port is not electrically connected to the discharging connector,
the fitted state is a state in which the discharging port is electrically connected to the discharging connector and the discharging connector is not latched, and
the connected state is a state in which the discharging port is electrically connected to the discharging connector and the discharging connector is latched.

* * * * *